(12) United States Patent
Nakano et al.

(10) Patent No.: US 11,334,218 B2
(45) Date of Patent: May 17, 2022

(54) INFORMATION PROCESSING APPARATUS, INFORMATION PROCESSING METHOD, AND PROGRAM

(71) Applicant: SONY CORPORATION, Tokyo (JP)

(72) Inventors: Aki Nakano, Chiba (JP); Takuto Ishikawa, Tokyo (JP); Shuto Naruse, Tokyo (JP); Masashi Ishikawa, Kanagawa (JP); Tomohiko Nagayama, Tokyo (JP); Naoya Hoshino, Kanagawa (JP); Masahiro Sueyoshi, Kanagawa (JP); Hideki Fukasawa, Kanagawa (JP); Masayuki Ishikura, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 522 days.

(21) Appl. No.: 15/319,466

(22) PCT Filed: Jul. 1, 2015

(86) PCT No.: PCT/JP2015/003318
§ 371 (c)(1),
(2) Date: Dec. 16, 2016

(87) PCT Pub. No.: WO2016/009605
PCT Pub. Date: Jan. 21, 2016

(65) Prior Publication Data
US 2017/0322683 A1 Nov. 9, 2017

(30) Foreign Application Priority Data
Jul. 15, 2014 (JP) .............................. JP2014-145224

(51) Int. Cl.
*G06F 3/0482* (2013.01)
*G06F 3/041* (2006.01)
(Continued)

(52) U.S. Cl.
CPC .......... *G06F 3/0482* (2013.01); *G06F 3/0412* (2013.01); *G06F 3/0416* (2013.01); *G06F 3/0488* (2013.01); *G06F 9/06* (2013.01)

(58) Field of Classification Search
CPC .... G06F 3/0482; G06F 3/0416; G06F 3/0488; G06F 9/06; G06F 3/0412
(Continued)

(56) References Cited

U.S. PATENT DOCUMENTS 6,365,815 B2 * 4/2002 Ishida .................. G09B 15/003
715/708
2006/0095848 A1 * 5/2006 Naik ....................... G06F 9/451
715/716
(Continued)

*Primary Examiner* — Hope C Sheffield
(74) *Attorney, Agent, or Firm* — Paratus Law Group, PLLC

(57) ABSTRACT

There is provided an information processing apparatus including a display unit, and a plurality of sensor elements, wherein the plurality of sensor elements are provided separate from the display unit, wherein the display unit is configured to switch display between a plurality of output screens based on a user input on the plurality of sensor elements, the plurality of output screens including output screens having different hierarchical levels and output screens having a same hierarchical level, and wherein the output screens having different hierarchical levels display information on the different hierarchical levels, and the switching display is controlled to switch display directly between the output screens having different hierarchical levels based on the user input.

18 Claims, 17 Drawing Sheets

(51) Int. Cl.
*G06F 3/0488* (2022.01)
*G06F 9/06* (2006.01)

(58) Field of Classification Search
USPC ........................................ 715/700
See application file for complete search history.

(56) References Cited

U.S. PATENT DOCUMENTS

| | | | | |
|---|---|---|---|---|
| 2006/0271867 | A1* | 11/2006 | Wang | G06F 3/0482 |
| | | | | 715/764 |
| 2009/0141046 | A1* | 6/2009 | Rathnam | G06F 3/0482 |
| | | | | 345/661 |
| 2009/0322484 | A1* | 12/2009 | Toriyama | G06K 19/0723 |
| | | | | 340/10.1 |
| 2010/0164878 | A1* | 7/2010 | Bestle | G06F 3/03547 |
| | | | | 345/173 |
| 2010/0251181 | A1* | 9/2010 | Lal | H04N 1/00347 |
| | | | | 715/834 |
| 2011/0113371 | A1* | 5/2011 | Parker | G06F 1/3215 |
| | | | | 715/810 |
| 2012/0110517 | A1* | 5/2012 | Sparks | G06F 3/0482 |
| | | | | 715/863 |
| 2012/0113044 | A1* | 5/2012 | Strazisar | G06F 1/169 |
| | | | | 345/174 |
| 2014/0282013 | A1* | 9/2014 | Amijee | G06F 16/4393 |
| | | | | 715/732 |
| 2014/0325446 | A1* | 10/2014 | Gojyo | G06F 16/242 |
| | | | | 715/833 |
| 2015/0089360 | A1* | 3/2015 | Brisebois | G06F 3/0488 |
| | | | | 715/702 |
| 2015/0363070 | A1* | 12/2015 | Katz | G06F 3/017 |
| | | | | 715/852 |

* cited by examiner

[Fig. 1]
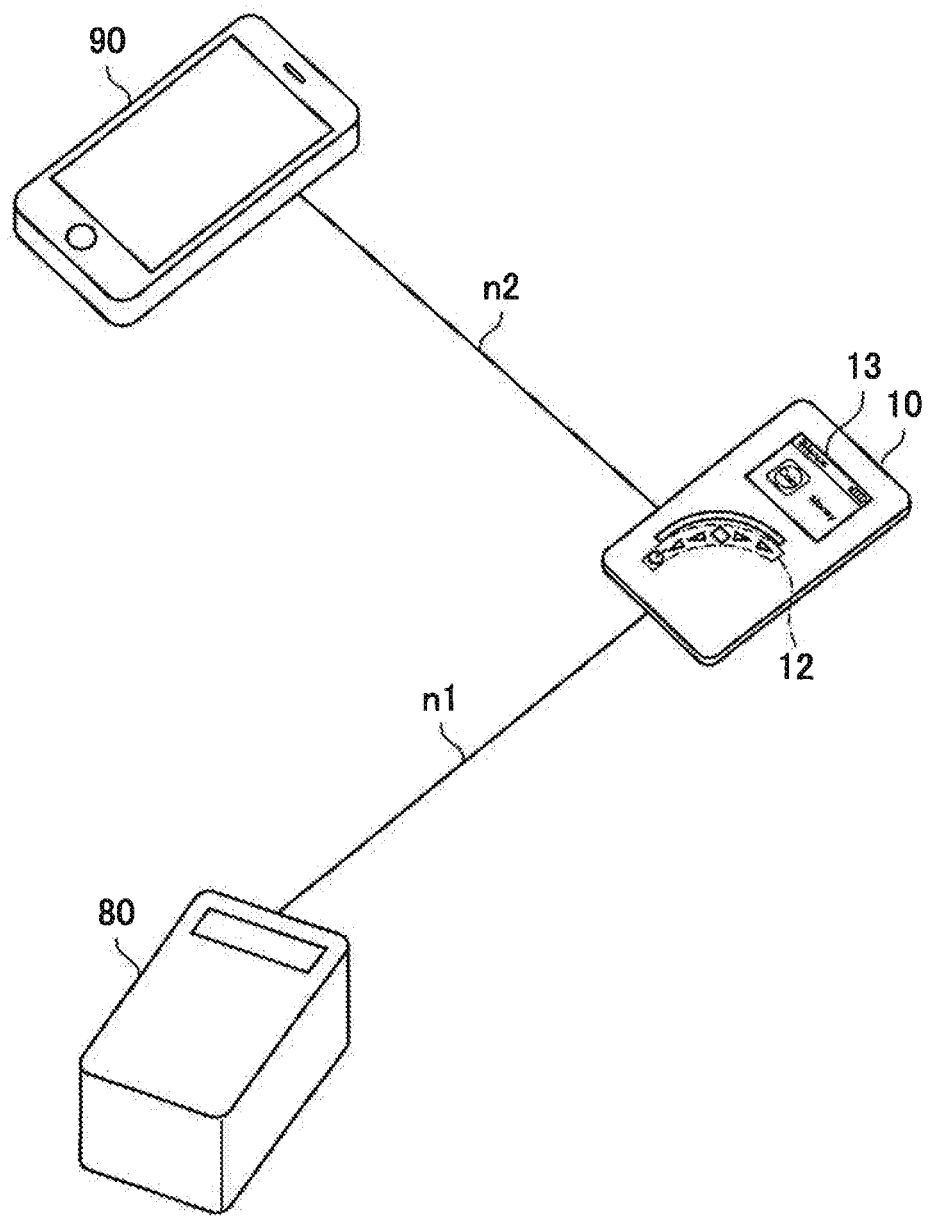

[Fig. 2]
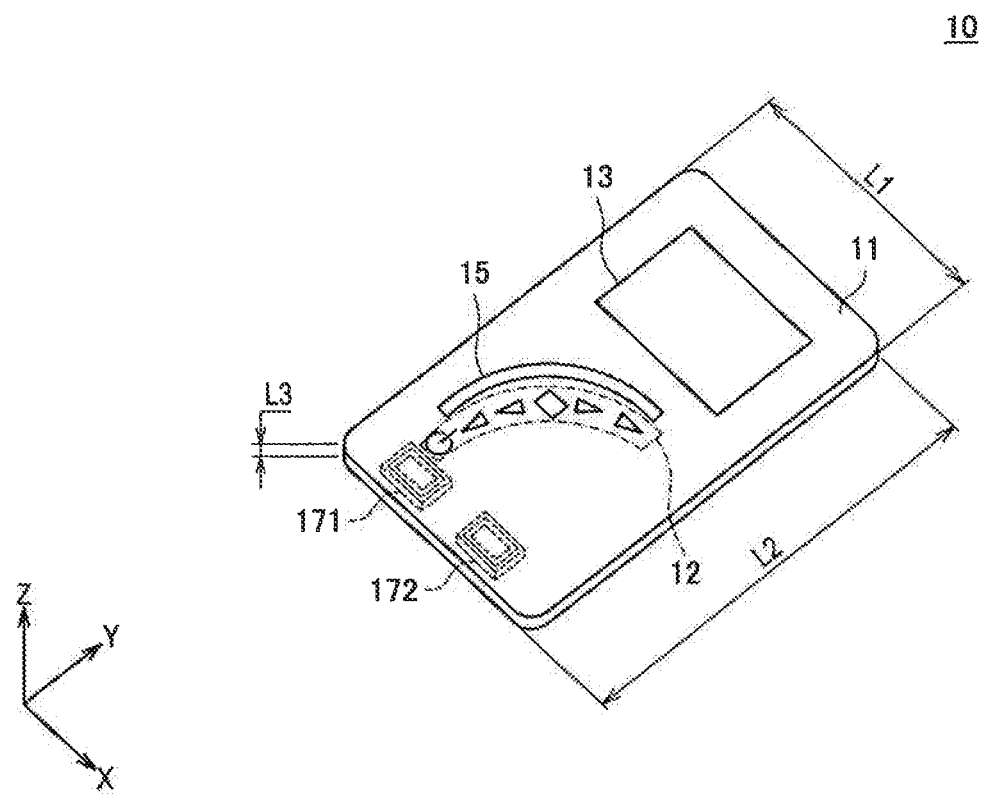

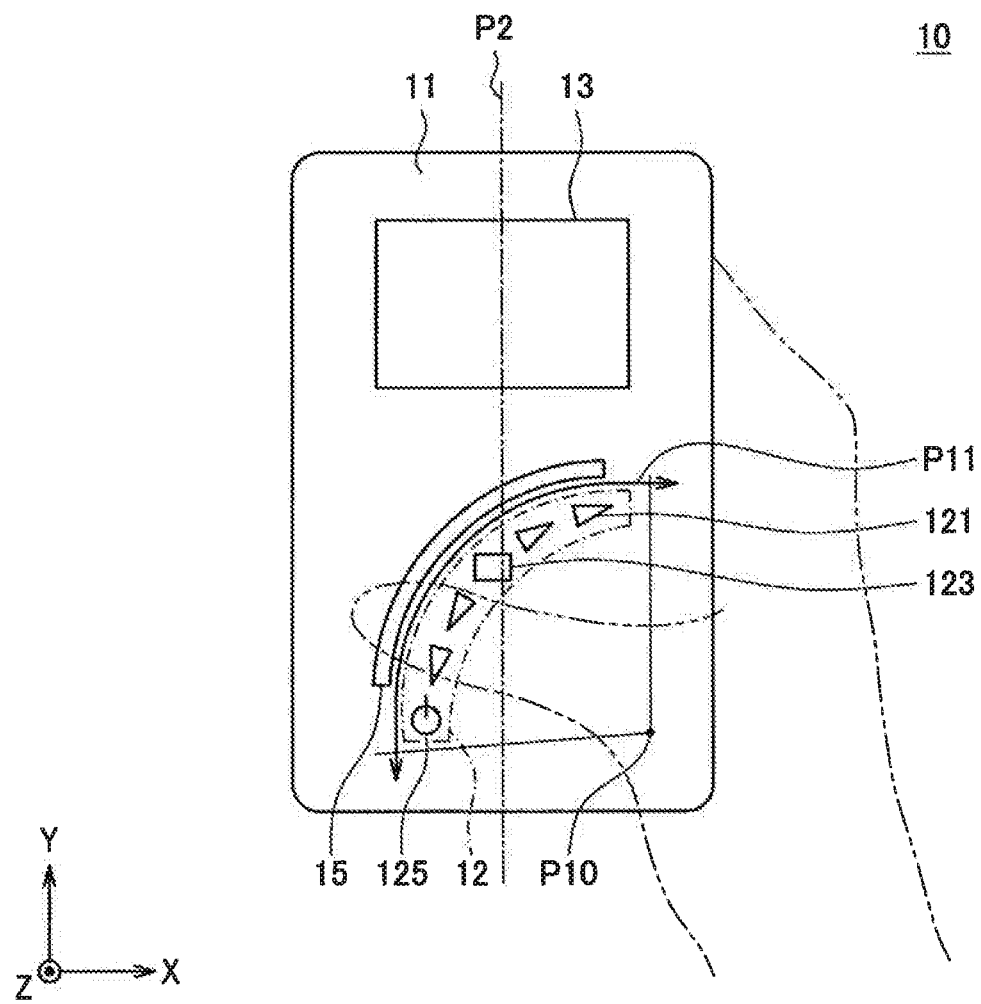
[Fig. 3]

[Fig. 4]
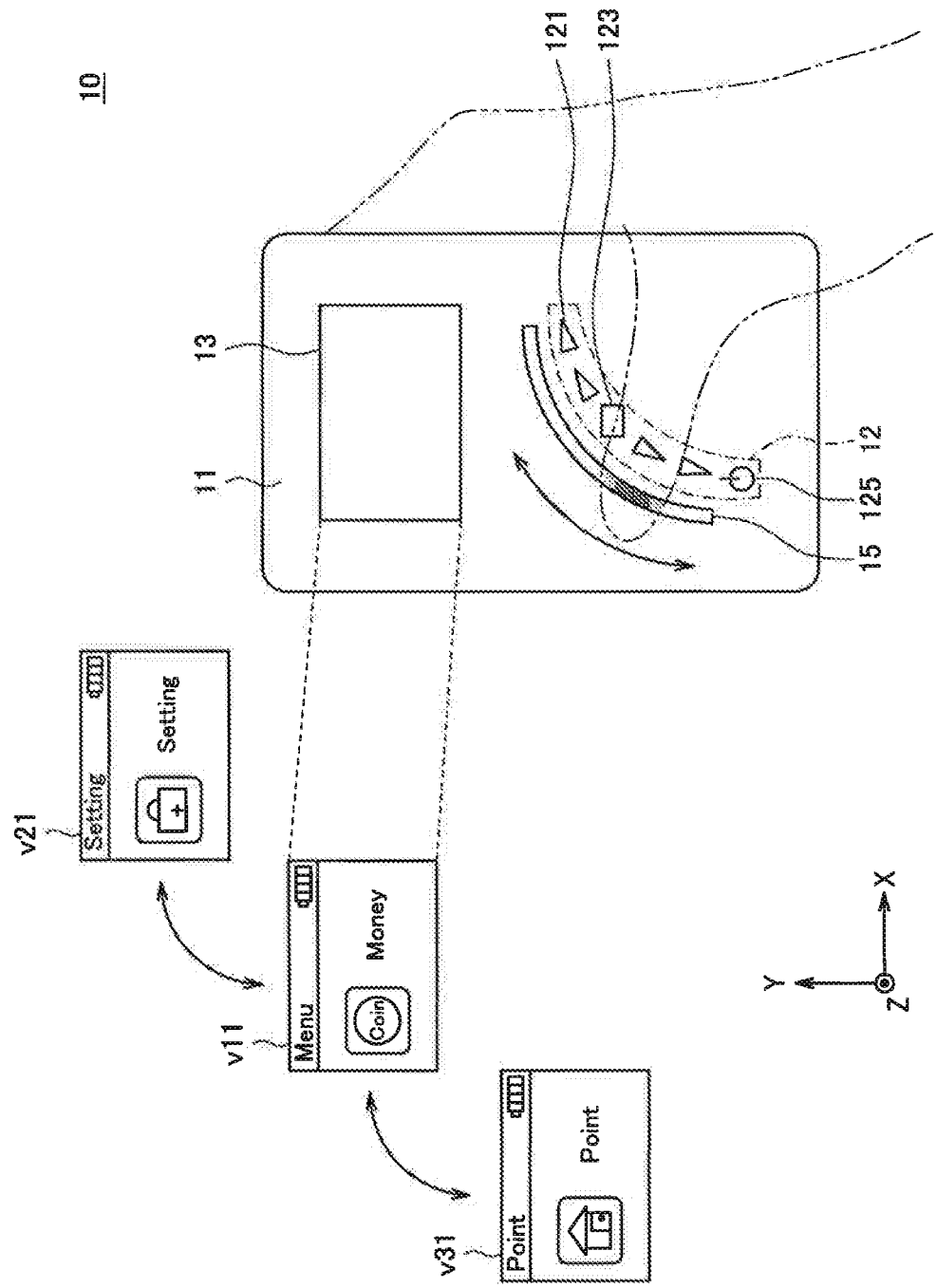

[Fig. 5]
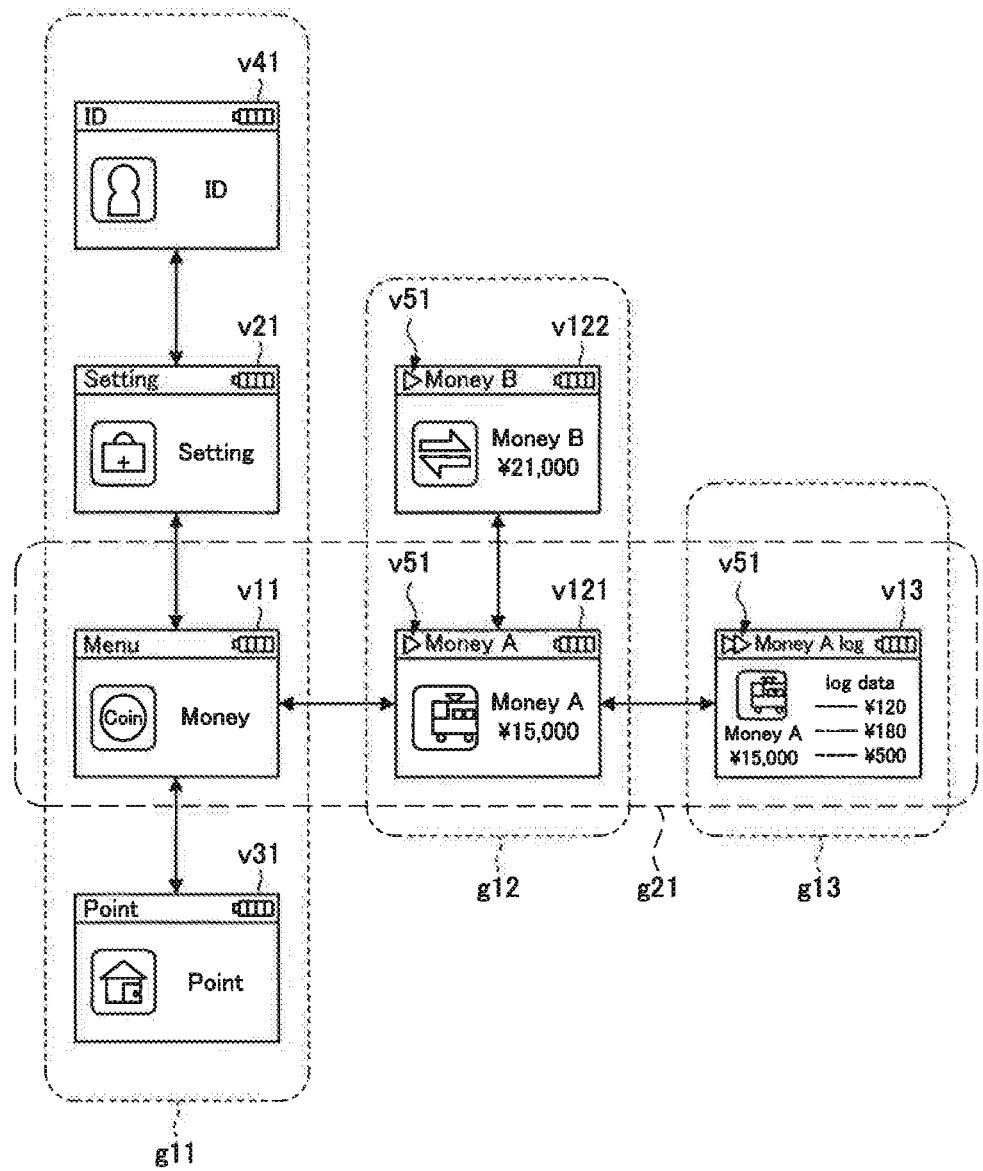

[Fig. 6]
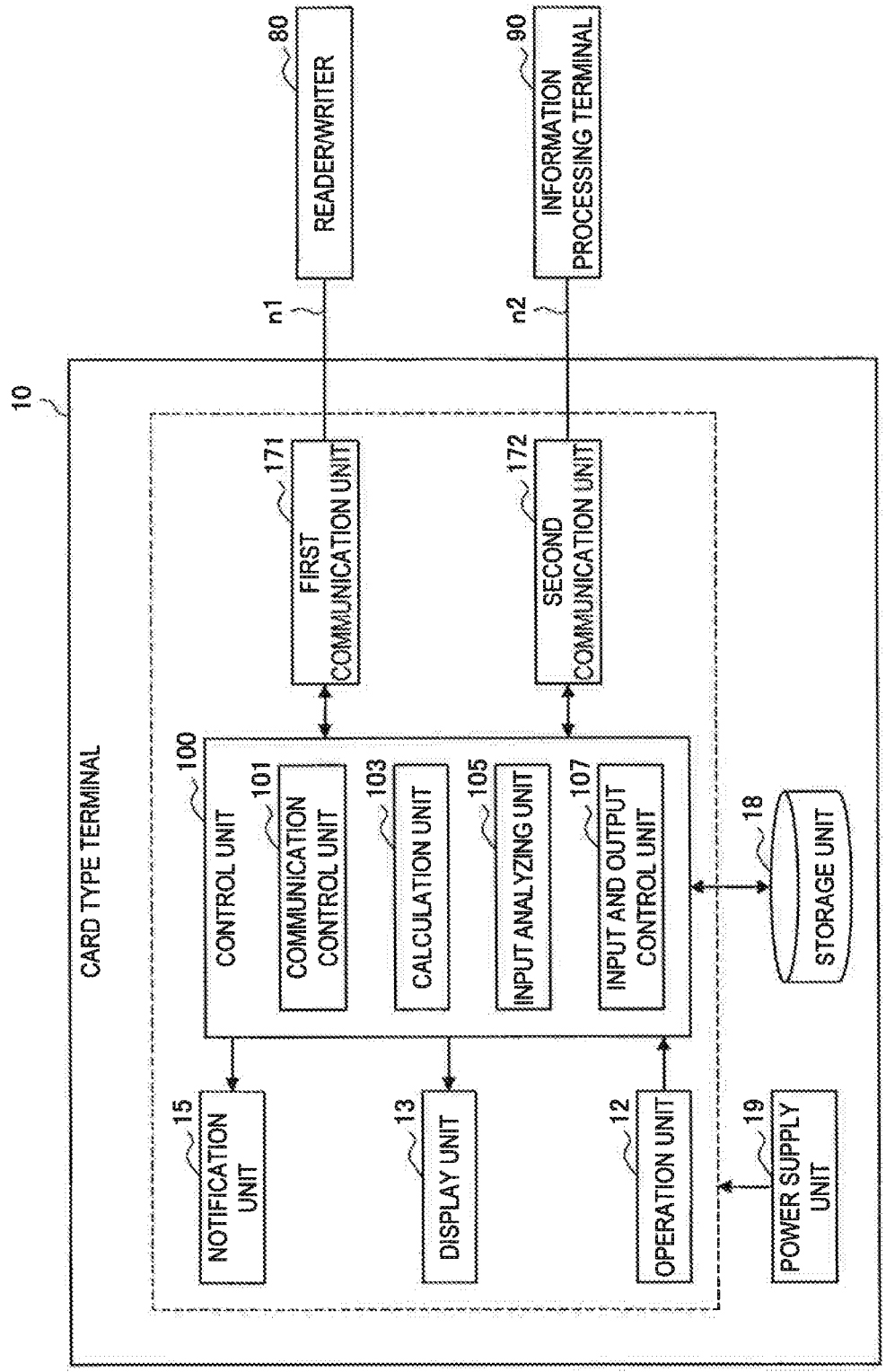

[Fig. 7]
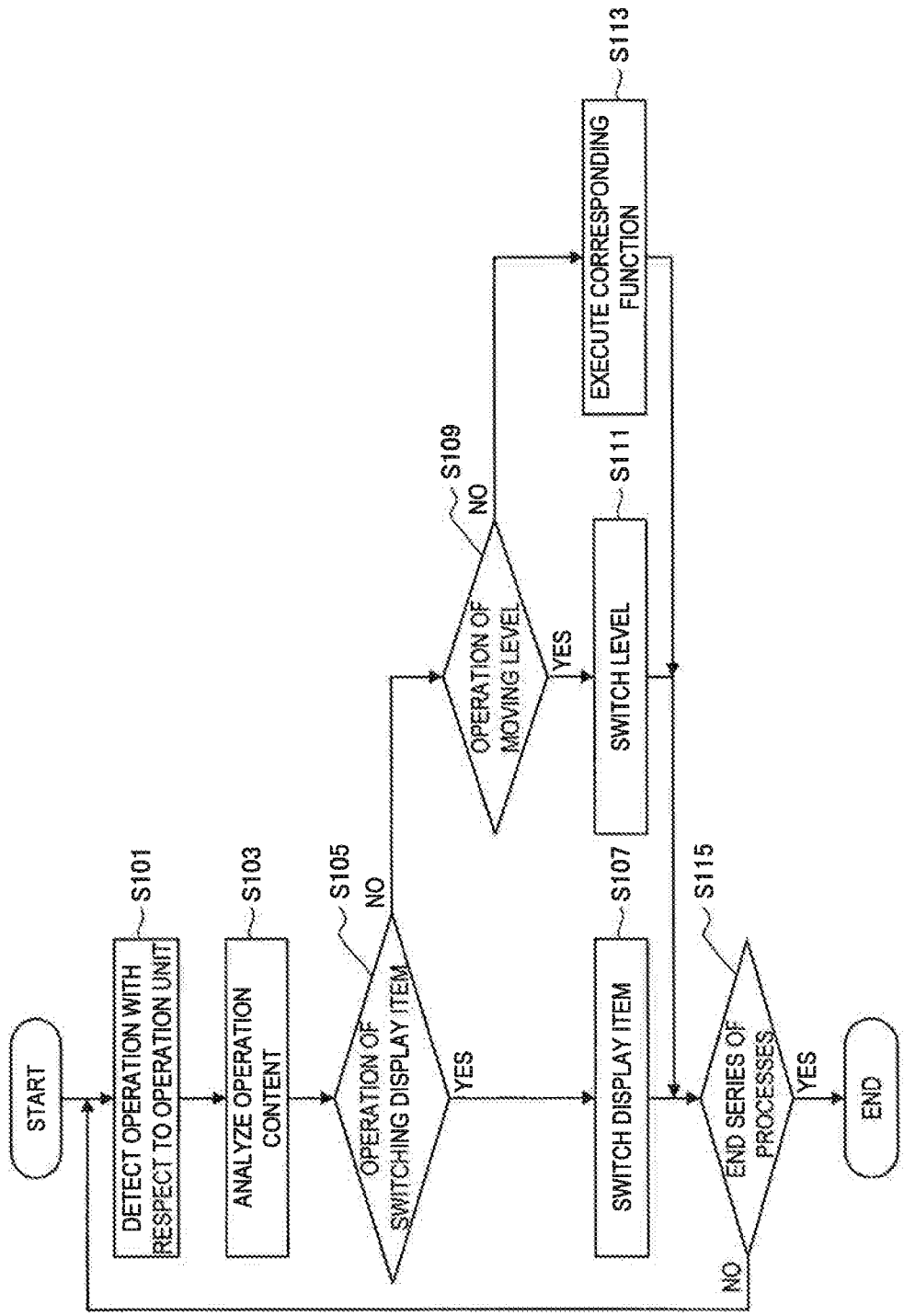

[Fig. 8]
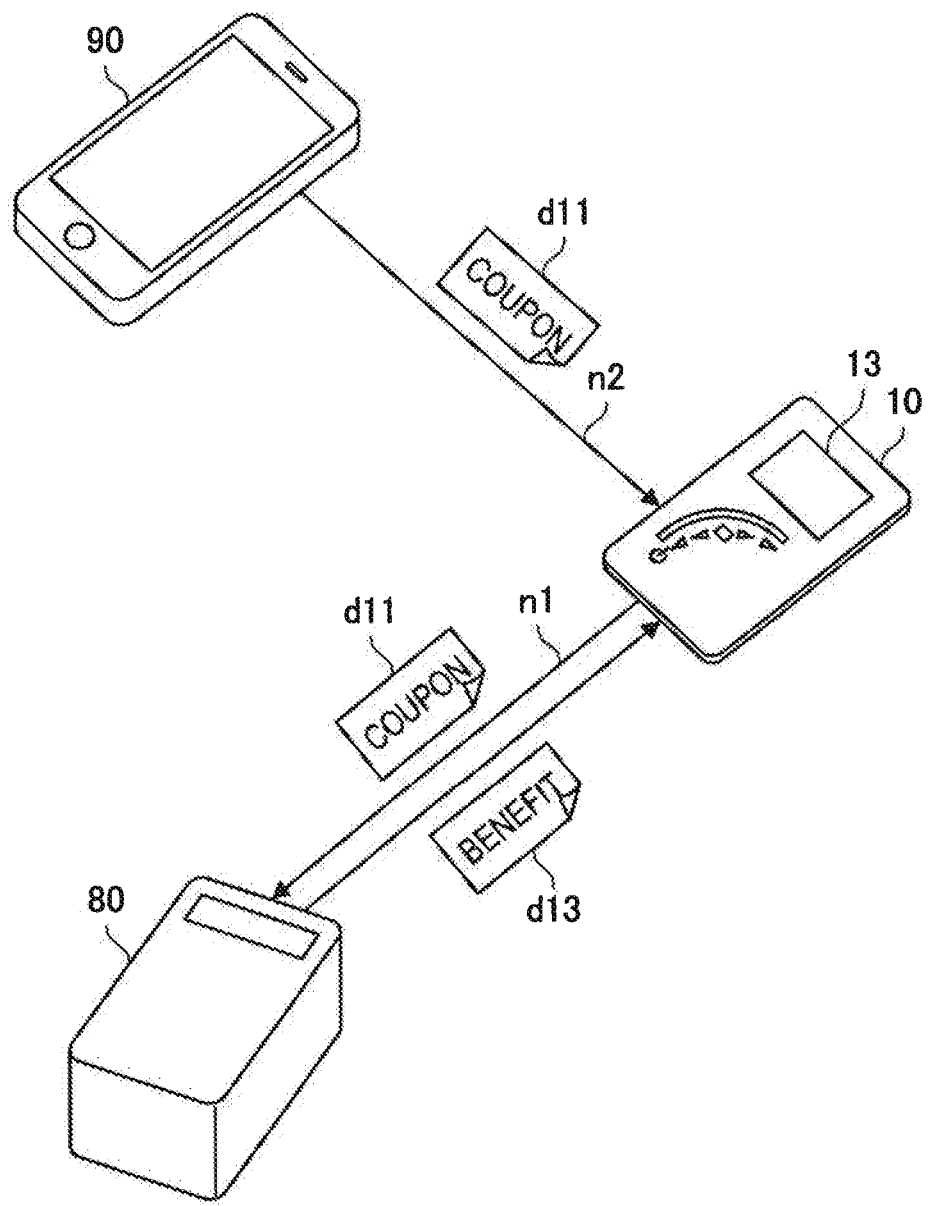

[Fig. 9]
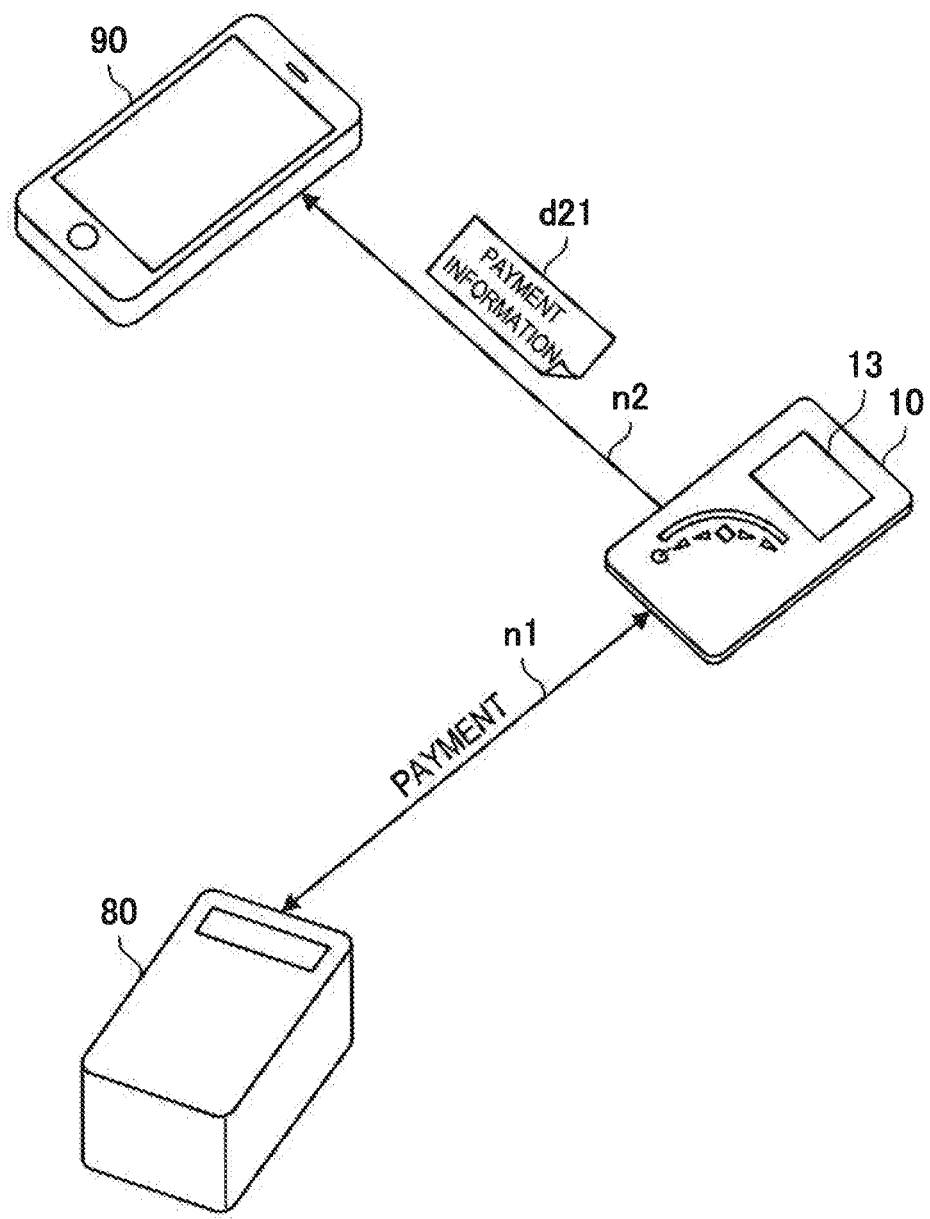

[Fig. 10]
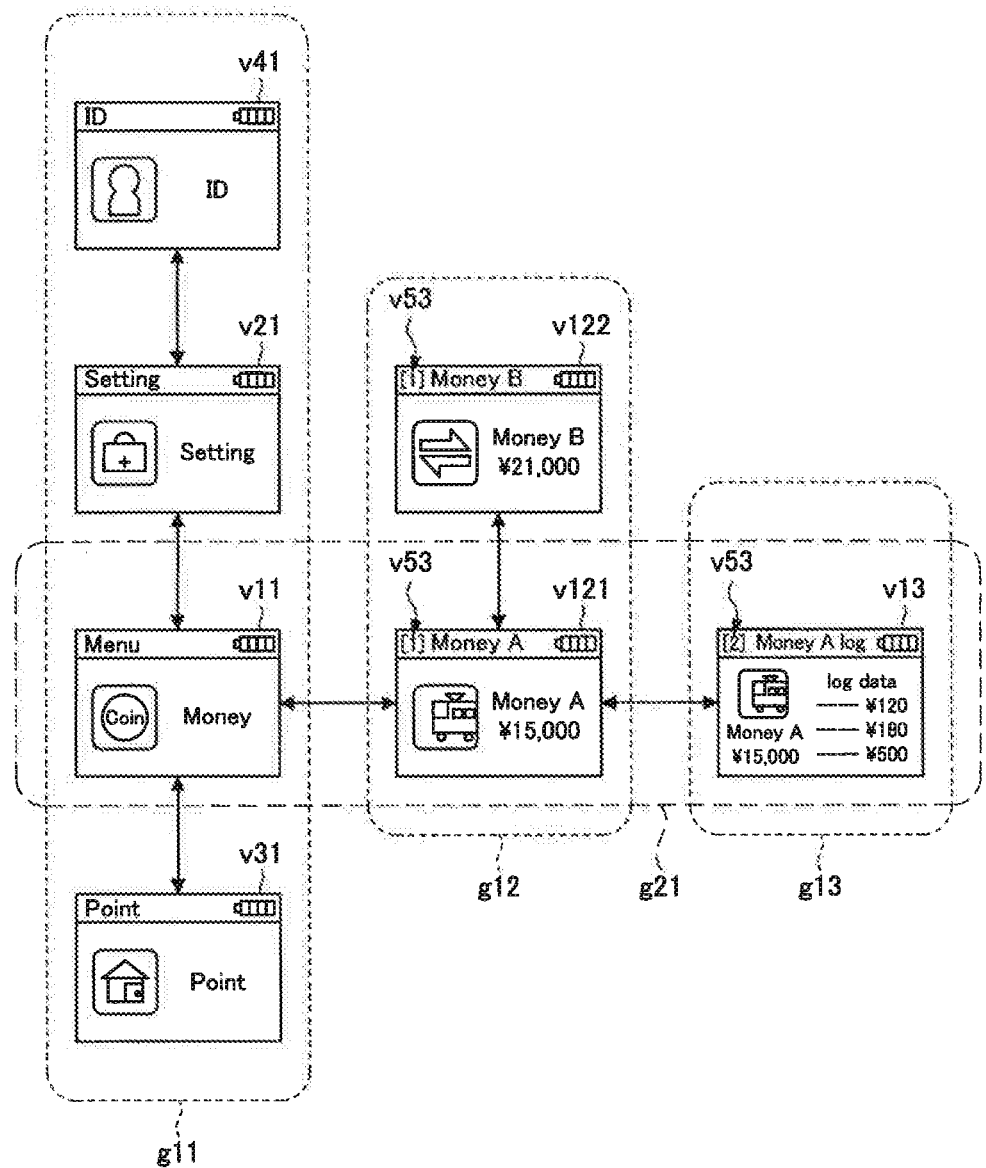

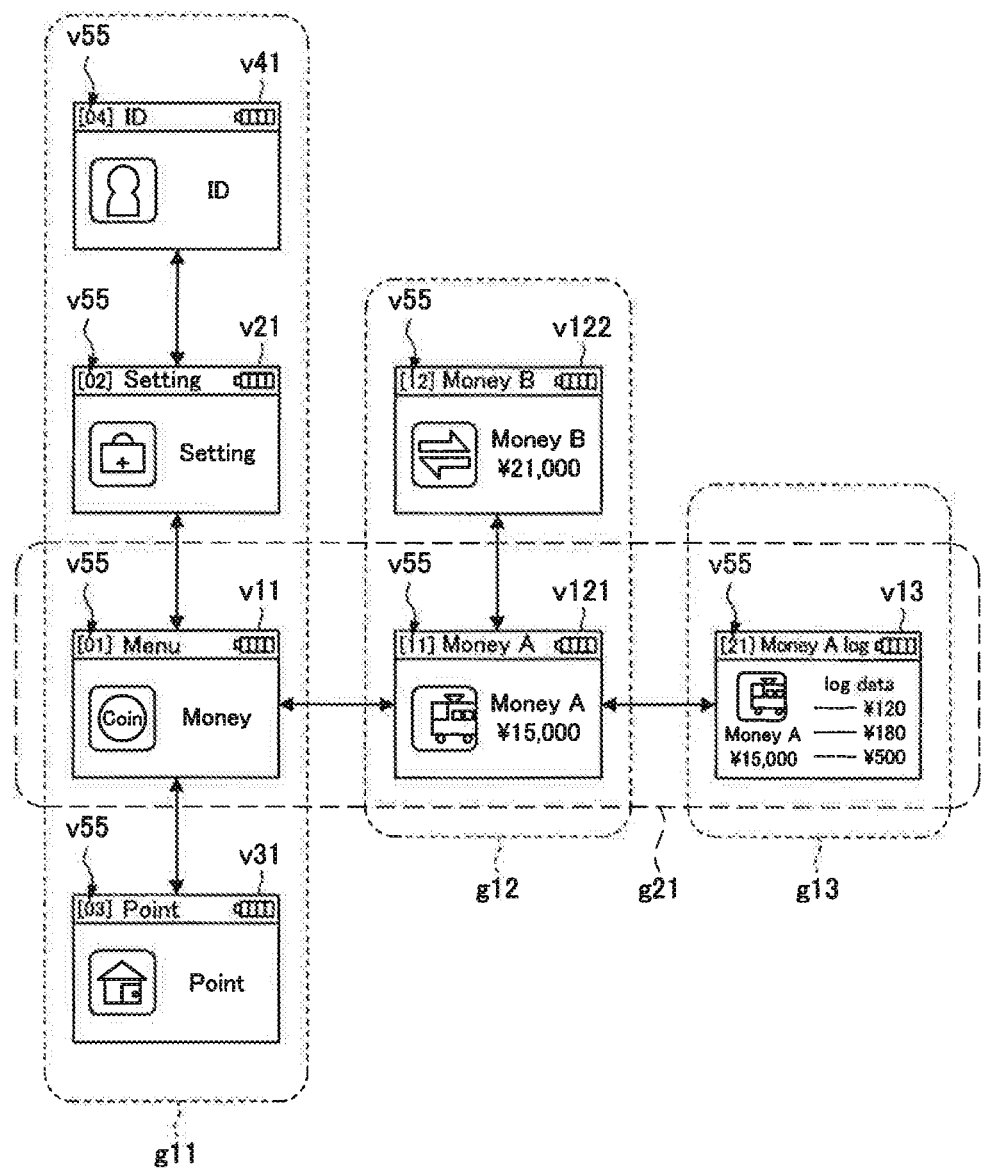
[Fig. 11]

[Fig. 12]
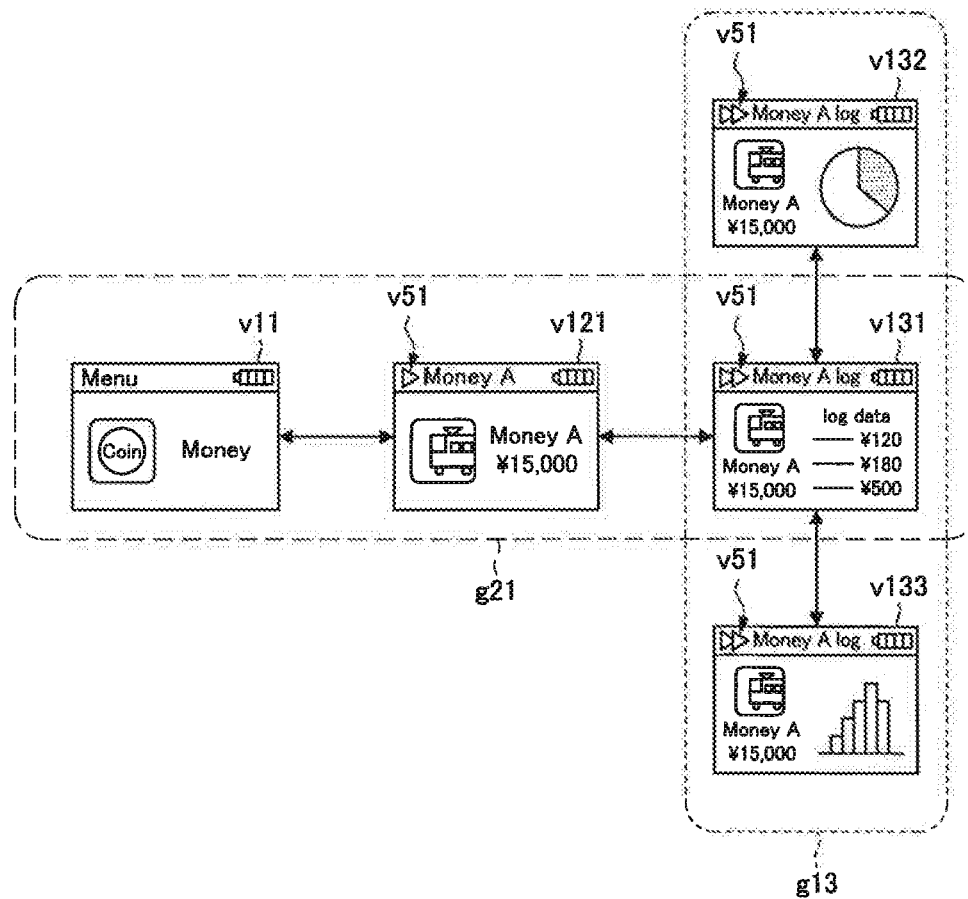

[Fig. 13]
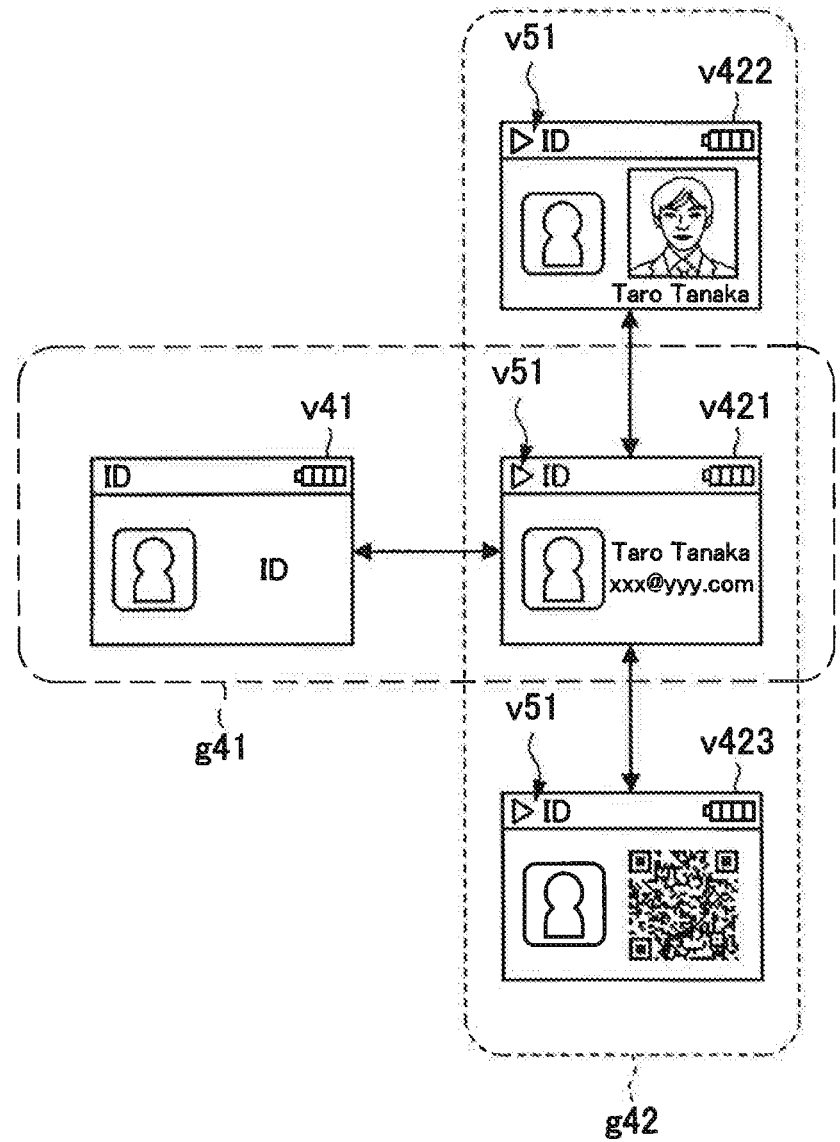

[Fig. 14]
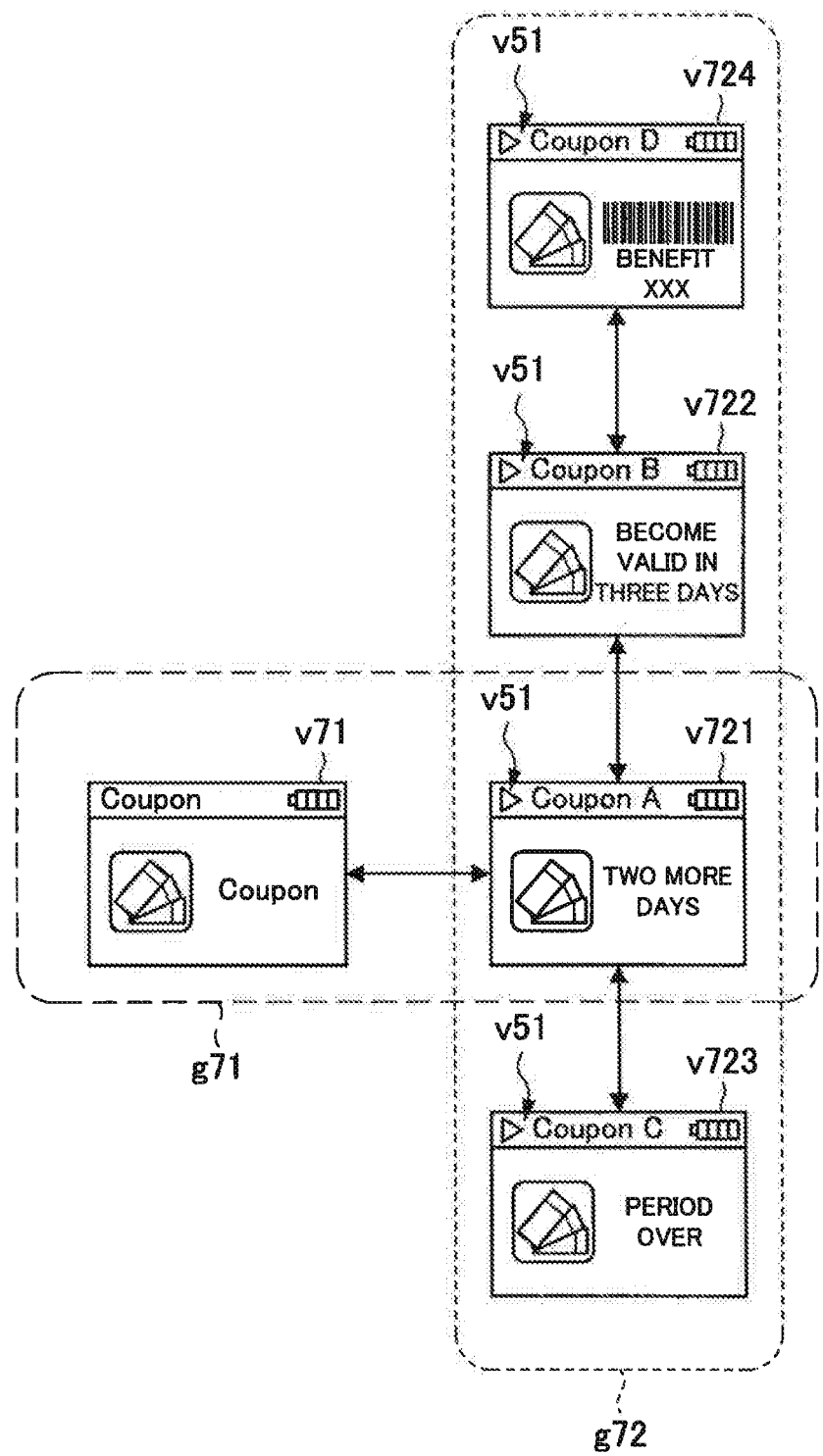

[Fig. 15]
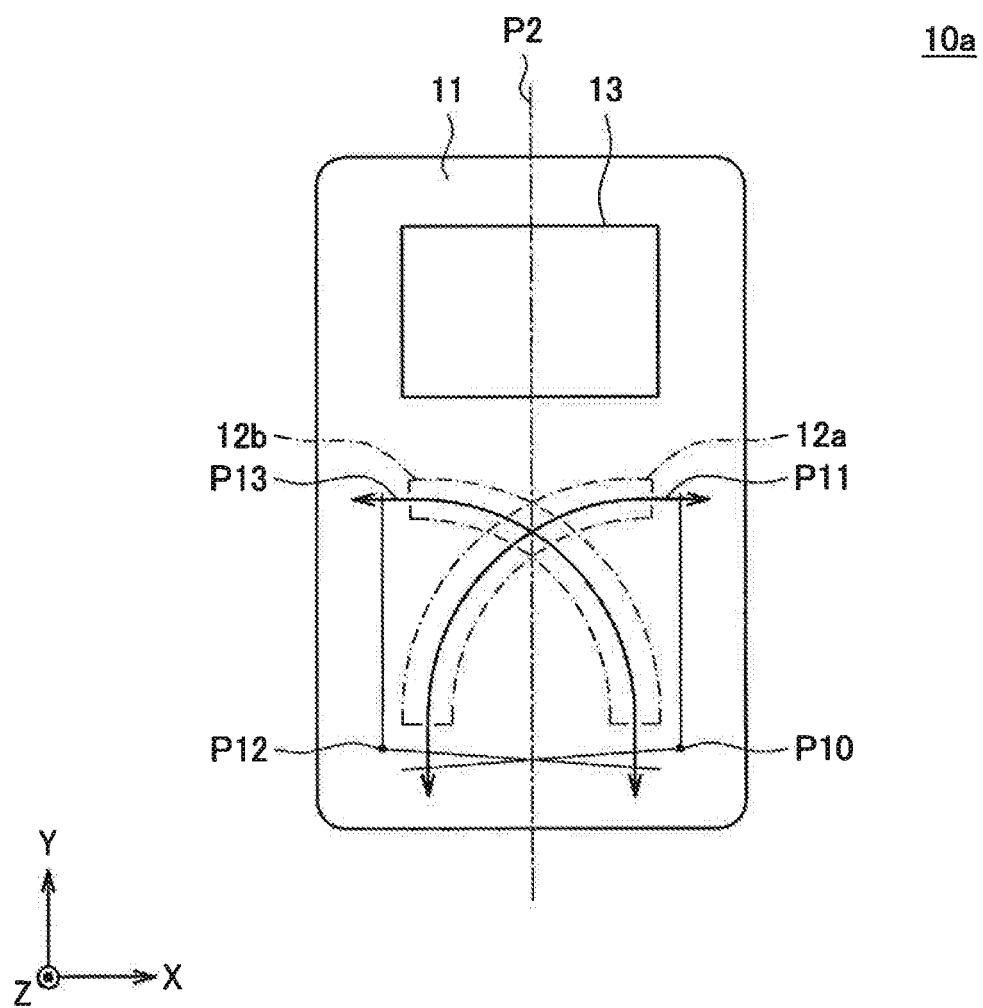

[Fig. 16]
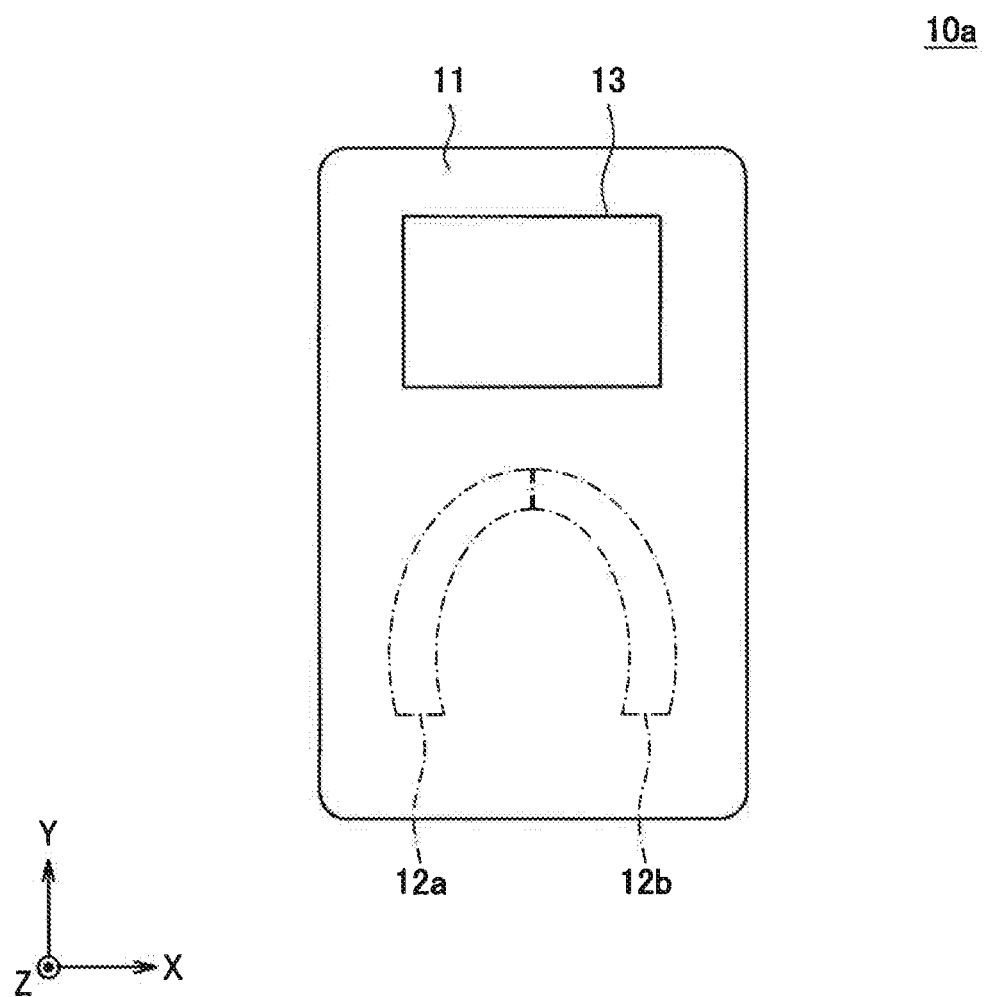

[Fig. 17]
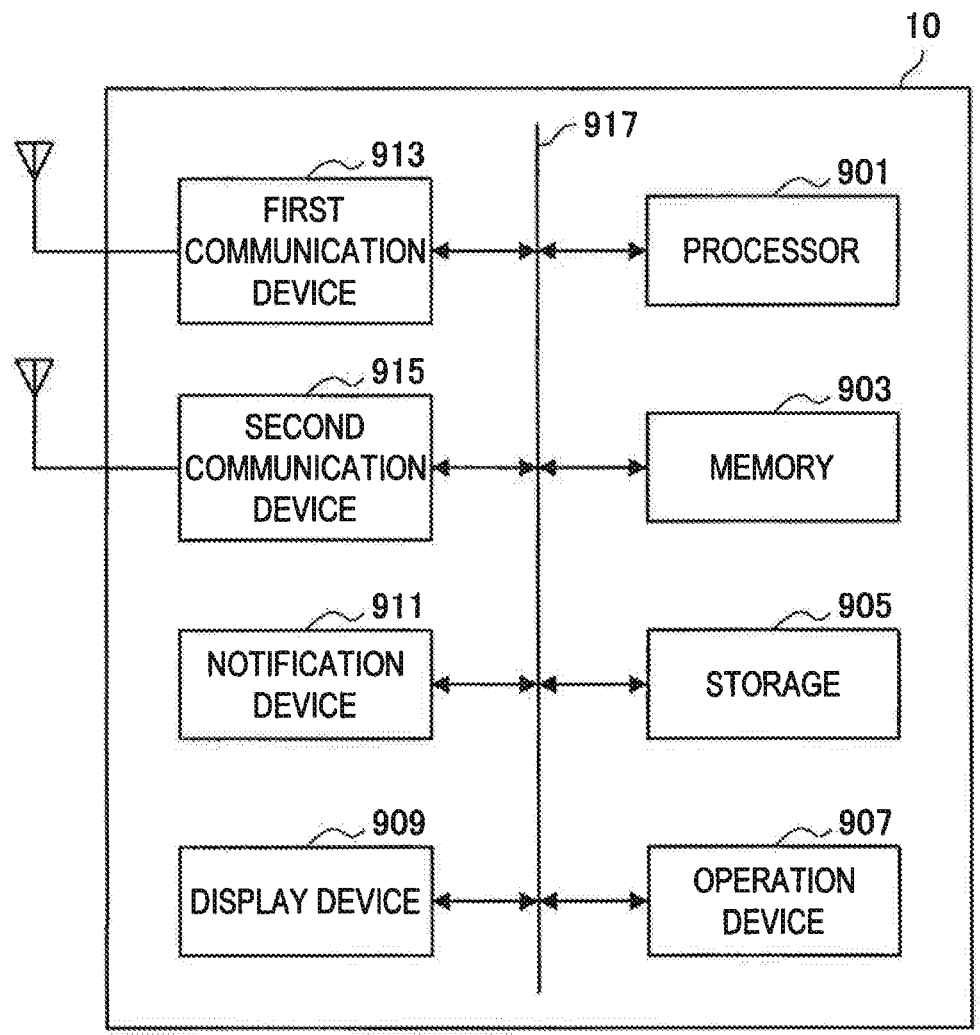

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2015/003318 (filed on Jul. 1, 2015) under 35 U.S.C. § 371, which claims the benefit of Japanese Priority Patent Application JP 2014-145224 filed Jul. 15, 2014, the entire contents of which are incorporated herein by reference.

TECHNICAL FIELD

The present disclosure relates to an information processing apparatus, an information processing method, and a program.

BACKGROUND ART

In recent years, a so-called contactless type IC card that has an integrated circuit (IC) and a contactless antenna module capable of performing contactless communication, and is able to contactlessly communicate with other devices, has proliferated. Contactless communication using such a contactless type IC card is used for, for example, transportation tickets, electronic moneys, ID cards, and access management.

Information stored in the contactless type IC card is read by an external device such as a personal computer (PC) or a smartphone through, for example, a reader/writer, and is presented to a user through the external device.

CITATION LIST

Patent Literature

[PTL 1]
JP 2012-128652A

SUMMARY

Technical Problem

Meanwhile, there is a need for a mechanism capable of presenting information stored in a contactless type IC card to a user using only the contactless type IC card with no external device. In view of such a need, for example, there is a technique in which an input and output interface such as a liquid crystal display (LCD) or a touch panel is provided in the contactless type IC card and the information stored in the contactless type IC card is presented to the user through the input and output interface.

However, a relatively small terminal having a size of about the contactless type IC card has a restricted area in which the input and output interface may be provided in proportion to a size of the terminal, and thus a size of the input and output interface is also restricted.

Therefore, the present disclosure proposes an information processing apparatus, an information processing method, and a program capable of presenting information in a more appropriate form even when a size of the input and output interface is restricted.

Solution to Problem

According to an embodiment of the present disclosure, there is provided an apparatus including a display unit, and a plurality of sensor elements, wherein the plurality of sensor elements are provided separate from the display unit, wherein the display unit is configured to switch display between a plurality of output screens based on a user input on the plurality of sensor elements, the plurality of output screens including output screens having different hierarchical levels and output screens having a same hierarchical level, and wherein the output screens having different hierarchical levels display information on the different hierarchical levels, and the switching display is controlled to switch display directly between the output screens having different hierarchical levels based on the user input.

According to another embodiment of the present disclosure, there is provided method including displaying at least one of a plurality of output screens on a display unit, detecting a user input on a plurality of sensor elements, wherein the plurality of sensor elements are provided separate from the display unit, and switching display between output screens of the plurality of output screens based on the user input on the plurality of sensor elements, the plurality of output screens including output screens having different hierarchical levels and output screens having a same hierarchical level, wherein the switching display is controlled to switch display directly between the output screens having different hierarchical levels based on the user input, and the output screens having different hierarchical levels display information on the different hierarchical levels.

According to another embodiment of the present disclosure, there is provided a non-transitory computer-readable medium having embodied thereon a program, which when executed by a computer causes the computer to execute a method, the method including displaying at least one of a plurality of output screens on a display unit, detecting a user input on a plurality of sensor elements, wherein the plurality of sensor elements are provided separate from the display unit, and switching display between output screens of the plurality of output screens based on the user input on the plurality of sensor elements, the plurality of output screens including output screens having different hierarchical levels and output screens having a same hierarchical level, wherein the switching display is controlled to switch display directly between the output screens having different hierarchical levels based on the user input, and the output screens having different hierarchical levels display information on the different hierarchical levels.

Advantageous Effects of Invention

According to one or more embodiments of the present disclosure as described above, there are provided an information processing apparatus, an information processing method, and a program capable of presenting information in a more appropriate form even when a size of the input and output interface is restricted.

Note that the effects described above are not necessarily limited, and along with or instead of the effects, any effect that is desired to be introduced in the present specification or other effects that can be expected from the present specification may be exhibited.

BRIEF DESCRIPTION OF DRAWINGS

FIG. 1 is a diagram illustrating an exemplary schematic configuration of an information processing system according to an embodiment.

FIG. 2 is a diagram illustrating an exemplary schematic configuration of a card type terminal according to an embodiment.

FIG. 3 is a diagram illustrating an exemplary schematic configuration of a card type terminal according to an embodiment.

FIG. 4 is a diagram illustrating exemplary control of screen display by a card type terminal according to an embodiment.

FIG. 5 is a diagram illustrating an exemplary screen layout according to switch between screens in a card type terminal according to an embodiment.

FIG. 6 is a block diagram illustrating an exemplary functional configuration of a card type terminal according to an embodiment.

FIG. 7 is a flowchart illustrating an exemplary series of operations of a card type terminal according to an embodiment.

FIG. 8 is a diagram illustrating an overview of operations of an information processing system according to Example 1-1.

FIG. 9 is a diagram illustrating an overview of operations of an information processing system according to Example 1-2.

FIG. 10 is a diagram illustrating an exemplary method of presenting hierarchical information.

FIG. 11 is a diagram illustrating an exemplary method of presenting hierarchical information.

FIG. 12 is a diagram illustrating an exemplary method of presenting information according to Example 3.

FIG. 13 is a diagram illustrating an exemplary method of presenting information according to Example 3.

FIG. 14 is a diagram illustrating an exemplary method of presenting information according to Example 3.

FIG. 15 is a diagram illustrating an exemplary configuration of an operation unit according to a modification.

FIG. 16 is a diagram illustrating another exemplary configuration of an operation unit according to a modification.

FIG. 17 is a diagram illustrating an exemplary hardware configuration of a card type terminal according to an embodiment.

DESCRIPTION OF EMBODIMENTS

Hereinafter, embodiments of the present disclosure will be described in detail with reference to the appended drawings. Note that in this specification and the appended drawings, structural elements that have substantially the same function and structure are denoted with the same reference numerals, and repeated explanation of these structural elements is omitted.

Description will be provided in the following order.
1. Overview
2. Schematic configuration
3. Display control
4. Functional configuration
5. Process
6. Examples
6.1. Example 1: Exemplary usage form of card type terminal
6.1.1. Example 1-1: Obtaining information from external device and using the information
6.1.2. Example 1-2: Output information to external device
6.2. Example 2: Exemplary method of presenting hierarchical information
6.3. Example 3: Exemplary method of presenting information
7. Modification
8. Hardware configuration
9. Conclusion

1. OVERVIEW

First, an overview of an information processing system according to an embodiment of the present disclosure will be described with reference to FIG. 1. FIG. 1 is a diagram illustrating an exemplary schematic configuration of an information processing system according to an embodiment.

As illustrated in FIG. 1, the information processing system according to an embodiment includes a card type terminal 10, a reader/writer 80, and an information processing terminal 90.

The card type terminal 10 includes a communication device using contactless short-range wireless communication technology such as NFC or RFID, and is able to communicate with the reader/writer 80 serving as an external device by communication through a communication path of the contactless short-range wireless communication. Examples of the communication device using the contactless short-range wireless communication technology such as NFC or RFID include an NFC tag and an NFC reader/writer.

The NFC tag receives a high frequency signal from the external device (for example, the reader/writer 80) through a connected antenna and decodes the received high frequency signal to obtain information from the reader/writer 80. In addition, the NFC tag controls load modulation based on the information that is obtained by decoding the high frequency signal, generates a high frequency signal related to a response to the external device, and transmits the generated high frequency signal to the external device through the antenna. According to such a configuration, the NFC tag establishes communication with the external device and outputs various pieces of information stored in a predetermined storage device to the external device.

The NFC reader/writer includes, for example, a high frequency signal generating unit, a demodulating unit, and an antenna, and serves as a reader/writer (or an interrogator) in NFC or the like.

The high frequency signal generating unit receives a high frequency signal generating instruction that is transmitted from a predetermined control unit and indicates transmission start of a high frequency signal, and generates a high frequency signal according to the high frequency signal generating instruction. In addition, the high frequency signal generating unit receives, for example, a high frequency signal transmission stop instruction that is transmitted from the control unit and indicates transmission stop of the high frequency signal and stops generation of the high frequency signal.

The demodulating unit performs, for example, envelope detection on an amplitude variation of a voltage between the high frequency signal generating unit and the antenna, binarizes the detected signal, and thus demodulates a signal (more specifically, for example, a signal transmitted by load modulation) transmitted from the external device. Then, the demodulating unit transmits the demodulated response signal (for example, a response signal indicating a response based on a process according to the high frequency signal) to the external device (for example, the reader/writer 80). Also, a method of demodulating the response signal in the demodulating unit is not limited to the above method. For example, a phase variation of a voltage between the high frequency signal generating unit and the antenna may be used to demodulate the response signal.

According to such a configuration, the card type terminal 10 establishes a network n1 of contactless short-range wireless communication with the reader/writer 80 serving as the external device, and is able to transmit and receive information to and from the reader/writer 80 via the network n1.

The reader/writer 80 includes a communication device using contactless short-range wireless communication technology similar to the card type terminal 10, and is able to communicate with the card type terminal 10 through a communication path of the contactless short-range wireless communication.

Examples of information that is transmitted and received between the card type terminal 10 and the reader/writer 80 include a so-called electronic value such as a coupon or electronic money, various pieces of authentication information, and the like.

In addition, the card type terminal 10 is able to communicate with the information processing terminal 90 such as a smartphone or a PC via a wireless network n2. Specific examples of the wireless network n2 include networks based on communication based on IEEE 802.15 standards such as Bluetooth (registered trademark) standards and communication based on IEEE 802.11 standards such as Wi-Fi (registered trademark).

According to such a configuration, the card type terminal 10 is able to obtain various pieces of information (for example, an electronic value) stored in the information processing terminal 90 by communication with the information processing terminal 90, via, for example, the network n2. Also, note that the card type terminal 10 may store or keep the obtained various pieces of information in, for example, a storage unit such as a memory or a storage that is provided therein. It is needless to say that the card type terminal 10 may also transmit the information obtained from the information processing terminal 90 via the network n2 to the reader/writer 80 via the network n1.

In addition, the card type terminal 10 may output the information stored in the storage unit provided therein to the information processing terminal 90 via the network n2. As a specific example, the card type terminal 10 may store a usage history of the electronic value resulting from communication with the reader/writer 80 via the network n1 in the storage unit, and output the usage history to the information processing terminal 90 via the network n2.

According to such a configuration, it is possible to operate such that the card type terminal 10 may obtain and keep information from, for example, either of the reader/writer 80 and the information processing terminal 90, and transmit the information to the other thereof. Also, exemplary operations using communication among the card type terminal 10, the reader/writer 80 and the information processing terminal 90 will be described below as a separate example.

Also, a circuit group for the card type terminal 10 to implement various functions may be integrated as an IC chip. Examples of the circuit group include a component (circuit group) other than the antenna and a component (circuit group) configured to control operations of the operation unit 12 and the display unit 13 in the communication device for the card type terminal 10 to communicate with the external device via each of the networks n1 and n2.

According to such a configuration, the card type terminal 10 according to an embodiment has a case that is formed in a card shape such as a so-called contactless type IC card, and it is possible to restrict a size thereof to substantially the same size as the contactless type IC card. As a specific example, a size of the case of the card type terminal 10 according to an embodiment may be restricted to an upper surface with a short side of about 54.0 mm and a long side of about 85.6 mm, and a thickness may be restricted to about 0.76 mm to 1.6 mm (that is, a thickness of one or two contactless type IC cards).

In addition, the card type terminal 10 according to an embodiment includes the operation unit 12 and the display unit 13, and is able to present the information stored or kept in the card type terminal 10 to the user through the display unit 13 based on a user operation through the operation unit 12. For example, as exemplified in FIG. 1, the operation unit 12 and the display unit 13 are provided on an upper surface of the card type terminal 10.

In this manner, when a size of the card type terminal 10 is restricted and the operation unit 12 and the display unit 13 are provided on the upper surface of the card type terminal 10, the user is able to operate the card type terminal 10 with one of his or her hands. In this case, for example, the user grips the card type terminal 10 with one of his or her hands and operates the operation unit 12 provided on the upper surface of the card type terminal 10 with a finger (for example, the thumb) of the hand.

Meanwhile, when a size of the card type terminal 10 is restricted to substantially the same size as a so-called contactless type IC card, the case has a smaller size than a so-called smartphone and an area in which an input and output interface such as the operation unit 12 or the display unit 13 may be provided is restricted.

In addition, in a device used as the input and output interface, there is a factor that inhibits an interlink of a magnetic field for communication by the antenna when it is closer to an antenna for contactless short-range wireless communication such as NFC. As a result, it may inhibit the contactless short-range wireless communication.

For this reason, when the input and output interface is provided in the card type terminal 10, in consideration of a positional relation with the antenna so as not to inhibit contactless short-range wireless communication, there is a need to provide the input and output interface in a restricted area, and a size thereof is restricted.

Therefore, the present disclosure provides the card type terminal 10 that is easy for the user to operate and able to present information in a form appropriate for the user even when the input and output interface has a restricted size. Therefore, the card type terminal 10 according to an embodiment will be described in further detail below.

2. SCHEMATIC CONFIGURATION

First, an exemplary schematic configuration of the card type terminal 10 according to an embodiment will be described with reference to FIG. 2. FIG. 2 is a diagram illustrating an exemplary schematic configuration of the card type terminal 10 according to an embodiment and is a schematic perspective view of the card type terminal 10. Also, in FIG. 2, in a case of the card type terminal 10 formed in a card shape, a short direction of an upper surface 11 is an x direction, a long direction thereof is a y direction, and a thickness direction of the card type terminal 10 is a z direction.

In FIG. 2, a reference numeral L1 represents a width (that is, a width in the x direction) of a short side of the upper surface 11 of the card type terminal 10. In addition, a reference numeral L2 represents a width (that is, a width in the y direction) of a long side of the upper surface 11 of the card type terminal 10. In addition, a reference numeral L3 represents a thickness (that is, a width in the z direction) of the card type terminal 10.

As described above, the card type terminal 10 according to an embodiment has a size that is restricted to substantially the same size as a so-called contactless type IC card. As a specific example, the upper surface 11 of the card type terminal 10 has a short side with a width L1 of about 54.0 mm and a long side with a width L2 of about 85.6 mm. In addition, the card type terminal 10 has a thickness L3 of about 0.76 mm to 1.6 mm, and the thickness corresponds to a thickness of one to two contactless type IC cards. Also, the size of the card type terminal 10 represented above is only an example, and it is needless to say that the present disclosure is not necessarily limited to the above size.

In addition, as illustrated in FIG. 2, the card type terminal 10 according to an embodiment includes an operation unit 12, a display unit 13, a notification unit 15, a first communication unit 171, and a second communication unit 172.

The first communication unit 171 corresponds to a communication device for the card type terminal 10 to communicate with the reader/writer 80 via the network n1 of contactless short-range wireless communication as illustrated in FIG. 1. In particular, FIG. 2 schematically illustrates an antenna of the communication device.

Similarly, the second communication unit 172 corresponds to a communication device for the card type terminal 10 to communicate with the information processing terminal 90 via the wireless network n2 as illustrated in FIG. 1. In particular, FIG. 2 schematically illustrates an antenna of the communication device.

As illustrated in FIG. 2, the first communication unit 171 and the second communication unit 172 are, for example, partially or entirely embedded in the case of the card type terminal 10.

The display unit 13 may include an output device that presents information to the user when the card type terminal 10 displays a screen. The display unit 13 may include, for example, a display device such as a liquid crystal display (LCD) or an organic light emitting diode (OLED) display.

The operation unit 12 may include a plurality of sensors configured to detect an operating body (for example, the user's finger) that comes in contact with or approaches an operation surface. Also, the sensor is described below as a "proximity sensor." The proximity sensor may detect contact of the operating body, as described above. In addition, the operation surface represents an area in which the operation unit 12 is able to receive the user's operation, in other words, corresponds to an area in which the sensor included in the operation unit 12 is able to detect contact or approach of the operating body.

The operation unit 12 receives the user operation such as a tap or a swipe by the operating body with respect to the card type terminal 10 using the proximity sensor. As a specific example, the operation unit 12 may receive a change in a position on the operation surface of the operating body that comes in contact with or approaches the operation surface and that is detected by the proximity sensor as a swipe operation. In addition, as another example, the operation unit 12 may receive contact of the operating body with respect to a part of the operation surface and that is detected by the proximity sensor as a tap operation.

The notification unit 15 may include a light emitting unit such as a light-emitting diode (LED). The notification unit 15 notifies of predetermined information according to a light emitting state (or a change in the light emitting state) of the light emitting unit. As a specific example, the notification unit 15 may notify of predetermined information using a lighting or blinking pattern. In addition, as another example, the notification unit 15 may notify of predetermined information by an intensity of light to be emitted. In addition, the notification unit 15 may notify of predetermined information by a color of light to be emitted. In this manner, as long as the notification unit 15 may notify of predetermined information according to the light emitting state of the light emitting unit, a method thereof is not specifically limited.

As illustrated in FIG. 2, the operation unit 12, the display unit 13, and the notification unit 15 are provided on the upper surface 11 of the card type terminal 10. Specifically, the display unit 13 is provided such that a display surface for displaying information is positioned on the upper surface 11. In addition, the operation unit 12 is provided such that the operation surface (that is, an area in which contact or approach of the operating body is detected) is positioned on the upper surface 11. That is, the operation surface of the operation unit 12 is provided to directly face the user when the user directly faces the display surface of the display unit 13.

Also, in the card type terminal 10 according to an embodiment, the display surface of the display unit 13 and the operation surface of the operation unit 12 are provided in different areas on the upper surface 11. In other words, in the card type terminal 10 according to an embodiment, an area (that is, the display surface) in which information is presented to the user and an area (that is, the operation surface) in which the user's operation is received are provided in different areas on the upper surface 11.

In particular, the LCD or the OLED display of the display unit 13 may use a component that may inhibit an interlink of a magnetic field for the first communication unit 171 to perform contactless short-range wireless communication with the external device. In addition, the card type terminal 10 according to an embodiment is formed to have a smaller size than a smartphone or the like, and particularly has a small thickness. Accordingly, it is difficult to provide a shielding material for preventing an interlink of the magnetic field from being inhibited in many cases.

On the other hand, as illustrated in FIG. 2, when the display surface of the display unit 13 and the operation surface of the operation unit 12 are provided in different areas on the upper surface 11, the display unit 13 and the first communication unit 171 may be provided separately from each other. Therefore, using a component included in the display unit 13, it is possible to prevent an interlink of the magnetic field for communication by the first communication unit 171 from being inhibited. In other words, a configuration in which the display unit 13 and the first communication unit 171 are provided separately from each other corresponds to a configuration in which the display unit 13 and the first communication unit 171 are provided in a positional relation in which an interlink of the magnetic field for communication by the first communication unit 171 is not inhibited.

In addition, when the display surface of the display unit 13 and the operation surface of the operation unit 12 are provided in different areas on the upper surface 11, it is possible to prevent the display surface from being shielded by the operating body when the user performs an operation. In particular, the card type terminal 10 according to an embodiment has a size that is restricted to being smaller than a smartphone. Therefore, for example, when the display surface of the display unit 13 is formed on the entire upper surface 11, and the operation unit 12 is formed on the display surface as a touch panel, most of the display surface is shielded by the operating body (for example, a finger) when the user performs an operation.

On the other hand, when the display surface of the display unit 13 and the operation surface of the operation unit 12 are provided in different areas on the upper surface 11, it is possible to prevent the display surface from being shielded by the operating body even when the user performs an operation.

Next, configurations of the operation unit 12 and the notification unit 15 will be described in detail with reference to FIG. 3. FIG. 3 is a diagram illustrating an exemplary schematic configuration of the card type terminal 10 according to an embodiment and illustrates detailed configurations of the operation unit 12 and the notification unit 15. Also, FIG. 3 illustrates an exemplary configuration of the card type terminal 10 illustrated in FIG. 2 seen from an upper side in the z direction so as to directly face the upper surface 11. Also, in the following description, an upward direction in the y direction in FIG. 3 corresponds to an upward direction of a screen displayed on the display unit 13. That is, FIG. 3 illustrates a configuration of the card type terminal 10 that has an orientation in which a screen displayed on the display unit 13 faces directly upward and the upper surface 11 is viewed from directly above.

As illustrated in FIG. 3, the operation unit 12 is configured such that proximity sensors 121 configured to detect contact or approach of the operating body are arranged in a direction P11 in areas different from the display surface of the display unit 13 on the upper surface 11, in the direction P11 along an arcuate axis. In this manner, when the plurality of proximity sensors 121 are arranged in the direction P11 along an arcuate axis, the card type terminal 10 detects a change (that is, a change in the position of the operating body in the direction P11) in the position of the operating body in the direction P11 along an arcuate axis on the operation surface, based on the detection result of each of the proximity sensor 121. That is, the card type terminal 10 is able to recognize the swipe operation (in other words, the swipe operation in the direction P11) in the direction P11 along an arcuate axis based on the detection result of each of the plurality of proximity sensors 121.

As exemplified in FIG. 3, the direction P11 along an arcuate axis is set such that a center P10 of the arc is positioned on the right with respect to an axis P2 that divides the upper surface 11 (in other words, the operation surface of the operation unit 12) into left and right in the x direction, and the arc is positioned on the left with respect to the center P10.

Therefore, as illustrated in FIG. 3, when the user grips the card type terminal 10 with his or her right hand, the direction P11 along an arcuate axis is set in a moving direction of the right thumb. According to such a configuration, the card type terminal 10 may detect the swipe operation by the right thumb when the user grips the card type terminal 10 with his or her right hand using the plurality of proximity sensors 121 that are arranged in the direction P11 along an arcuate axis. It is needless to say that the card type terminal 10 may also be configured such that the operation unit 12 is reversely set with respect to the axis P2 and the user may perform the operation with his or her left hand. In addition, the position in which each of the proximity sensors 121 is provided may be appropriately adjusted according to an assumed size of the user's hand. In addition, the center P10 may not necessarily be positioned on the upper surface 11.

In addition, as exemplified in FIG. 3, among the plurality of proximity sensors 121 that are arranged in the direction P11 along an arcuate axis, the proximity sensors indicated by reference numerals 123 and 125 enable the card type terminal 10 to recognize the tap operation with respect to the proximity sensors. Also, control when the tap operation is performed with respect to the proximity sensors 123 and 125 will be separately described below along with exemplary display control of a screen of the display unit 13.

The notification unit 15 is configured such that a plurality of light emitting units (for example, LEDs) are arranged in the direction P11 along an arcuate axis, similar to the plurality of proximity sensors 121. The plurality of light emitting units of the notification unit 15 each correspond to, for example, any of the plurality of proximity sensors 121 of the operation unit 12, and when the corresponding proximity sensor 121 detects the operating body, the light emitting unit lights up or blinks. According to such a configuration, for example, when the swipe operation in the direction P11 along an arcuate axis is detected by the operation unit 12, the card type terminal 10 may enable each of the light emitting units of the notification unit 15 to light up or blink according to the swipe operation. Accordingly, when each of the light emitting units of the notification unit 15 lights up or blinks, the user may intuitively recognize whether an operation performed with respect to the operation unit 12 is received.

The schematic configuration of the card type terminal 10 according to an embodiment has been described above with reference to FIGS. 2 and 3. As described above, in the card type terminal 10 according to an embodiment, the operation unit 12 is provided such that the proximity sensors 121 are arranged in areas different from the display unit 13 on the upper surface 11, in the direction P11 along an arcuate axis. According to such a configuration, the card type terminal 10 may detect the swipe operation with respect to the operation surface of the operation unit 12, in the direction P11 along an arcuate axis.

In addition, in the card type terminal 10 according to an embodiment, when the display surface of the display unit 13 and the operation surface of the operation unit 12 are provided in different areas on the upper surface 11, as illustrated in FIG. 2, the display unit 13 and the first communication unit 171 may be provided separately from each other. Also, positions of the first communication unit 171 and the second communication unit 172 illustrated in FIG. 2 are only an example. As long as the display unit 13 and the first communication unit 171 may be provided separately from each other, the positions of the first communication unit 171 and the second communication unit 172 are not specifically limited. As a specific example, when an antenna wire of the first communication unit 171 is provided along an end of the upper surface 11, and the display surface of the display unit 13 is provided near the center of the upper surface 11, the display unit 13 and the first communication unit 171 may be separate.

Also, it is needless to say that, as long as the operation unit 12 and the display unit 13 may be provided as illustrated in FIGS. 2 and 3, an information processing apparatus described above as the card type terminal 10 is not necessarily limited to the card type terminal. That is, when the information processing apparatus described above as the card type terminal 10 has, for example, a size at which the user is able to grip the apparatus with one of his or her hands and the operation unit 12 and the display unit 13 described above may be provided, a shape of the case of the information processing apparatus is not specifically limited. In addition, the information processing apparatus may be configured as a so-called wearable terminal.

3. DISPLAY CONTROL

Next, exemplary control in which the card type terminal 10 according to an embodiment displays a screen on the display unit 13 and thus information is presented to the user will be described. First, exemplary control of displaying a screen on the display unit 13 by the card type terminal 10 according to an embodiment will be described with reference to FIG. 4. FIG. 4 is a diagram illustrating exemplary control of screen display by the card type terminal 10 according to an embodiment.

The card type terminal 10 according to an embodiment includes a screen in which information presented to the user is classified as a plurality of items and information included in the item is displayed for each classified item. For example, reference numerals v11, v21, and v31 in FIG. 4 each indicate an exemplary screen displayed on the display unit 13 of the card type terminal 10 and each correspond to a screen for displaying information corresponding to a different item. In addition, information corresponding to the item displayed on each screen corresponds to an exemplary "display item."

The card type terminal 10 according to an embodiment displays any of screens (for example, screens v11, v21, and v31) corresponding to the classified items on the display unit 13. Then, when the card type terminal 10 detects the swipe operation with respect to the operation unit 12, the screen displayed on the display unit 13 is switched to a screen corresponding to another item in conjunction with the swipe operation.

Specifically, the card type terminal 10 fades the screen displayed on the display unit 13 out in a scrolling manner in an operation direction of the swipe operation. In addition, along with the fading out of the screen, the card type terminal 10 fades a screen corresponding to another item in in a scrolling manner in the same operation direction. Accordingly, the screen displayed on the display unit 13 is switched in conjunction with the swipe operation.

Also, in this case, the card type terminal 10 may synchronize an operation of switching the screen displayed on the display unit 13 with the detected swipe operation. It is needless to say that, when the swipe operation is in conjunction with the operation of switching the screen, the card type terminal 10 does not necessarily completely synchronize the swipe operation with the operation of switching the screen.

In addition, when the swipe operation with respect to the operation unit 12 is detected, the card type terminal 10 lights up or blinks each of the light emitting units of the notification unit 15 according to the swipe operation. Accordingly, when each of the light emitting units of the notification unit 15 lights up or blinks, the user may intuitively recognize whether an operation performed with respect to the operation unit 12 is received.

In addition, when the tap operation with respect to the proximity sensor 123 is detected, the card type terminal 10 recognizes that an item displayed on the display unit 13 at that time is selected, and displays detailed information of the item. In this case, the card type terminal 10 divides various pieces of information into a plurality of levels such that various pieces of information classified as items form a so-called tree structure, and displays a screen corresponding to any of the divided various pieces of information for each level on the display unit 13.

For example, FIG. 5 is a diagram illustrating an exemplary screen layout according to switching between screens in the card type terminal 10 according to an embodiment, and illustrates an example in which various pieces of information classified as items are divided into a plurality of levels to correspond to screens.

For example, as exemplified in FIG. 5, as illustrated in screens v11, v21, v31, and v41, first, various pieces of information are classified as a plurality of items, "Money (electronic money)," "Point," "Setting," or "ID (owner information)." A reference numeral g11 indicates a level to which screens v11, v21, v31, and v41 belong. Also, as exemplified in FIG. 5, a level g11 corresponds to the topmost level among the plurality of levels. That is, items displayed on screens v11, v21, v31, and v41 divided in the level g11 show classification based on a broader concept when information presented to the user is classified as a plurality of items.

In addition, reference numerals v121, v122, and v13 indicate screens associated with various pieces of information that are classified as items that show "Money" in association with the screen v11.

Specifically, as exemplified in FIG. 5, various pieces of information included in the item showing "Money" associated with the screen v11 are further classified as, for example, a plurality of items such as "Money A" and "Money B" for each type of the electronic money. Also, the screen v121 is a screen associated with an item showing "Money A." The screen v122 is a screen associated with an item showing "Money B." In addition, a reference numeral g12 corresponds to a level directly below the item showing "Money" among levels below the item showing "Money" associated with the screen v11. That is, a level below a predetermined item shows the predetermined item divided into more specific groups. In addition, a level above a predetermined item shows the predetermined item classified based on a broader concept.

In addition, the screen v13 is a screen associated with an item of "Money A log" that shows a usage history of "Money A" among information on the electronic money represented as "Money A," that is, among various pieces of information classified as "Money A."

That is, when the tap operation with respect to the proximity sensor 123 is detected, the card type terminal 10 recognizes that a level directly below the item shown on the screen displayed on the display unit 13 is selected, and displays a screen corresponding to any item among items included in the level on the display unit 13.

As a specific example, when the level g1 is selected (for example, an initial state), the card type terminal 10 switches a screen displayed on the display unit 13 to the screen v11, v21, v31, or v41 when the swipe operation with respect to the operation unit 12 is received.

In addition, if the tap operation with respect to the proximity sensor 123 is detected while the screen v11 is displayed on the display unit 13, the card type terminal 10 switches the selected level g11 to the level g12 directly below the item showing "Money" corresponding to the screen v11. Then, the card type terminal 10 displays a screen corresponding to any item among the screens v121 and v122 corresponding to items divided in the newly selected level g12 on the display unit 13. For example, as exemplified in FIG. 5, if the tap operation with respect to the proximity sensor 123 is detected while the screen v11 is displayed on the display unit 13, the card type terminal 10 displays the screen v121 corresponding to "Money A" on the display unit 13.

In addition, if the swipe operation with respect to the operation unit 12 is received while the level g12 is selected, the card type terminal 10 switches a screen displayed on the display unit 13 to the screen v121 or v122 corresponding to each item included in the level g12.

Similarly, if the tap operation with respect to the proximity sensor 123 is detected while the screen v121 is displayed on the display unit 13, the card type terminal 10 switches the selected level g12 to a level g13 directly below an item corresponding to the screen v121. Then, the card type terminal 10 displays any screen among screens corresponding to items that are classified into the level g13. As exemplified in FIG. 5, if the tap operation with respect to the proximity sensor 123 is detected while the screen v121 is displayed on the display unit 13, the card type terminal 10 displays the screen v13 corresponding to "Money A log" on the display unit 13.

On the other hand, when the tap operation with respect to the proximity sensor 125 is detected, the card type terminal 10 recognizes that an item directly above the item shown on the screen displayed on the display unit 13 is selected and displays a screen corresponding to the item directly thereabove on the display unit 13. In addition, in this case, the card type terminal 10 switches the selected level to a level into which the item directly thereabove is classified.

For example, if the tap operation with respect to the proximity sensor 125 is detected while the screen v13 is displayed on the display unit 13, the card type terminal 10 recognizes that an item directly above the screen v13 is selected and displays the screen v121 corresponding to the item directly thereabove on the display unit 13. In addition, in this case, the card type terminal 10 switches the selected level g13 to the level g12 into which an item corresponding to the screen v121 displayed on the display unit 13 is classified.

Similarly, if the tap operation with respect to the proximity sensor 125 is detected while the screen v121 is displayed on the display unit 13, the card type terminal 10 recognizes that an item directly above the screen v121 is selected and displays the screen v11 corresponding to the item directly thereabove on the display unit 13. In addition, in this case, the card type terminal 10 switches the selected level g13 to the level g12 into which an item corresponding to the screen v121 displayed on the display unit 13 is classified.

As described above, when the tap operation with respect to the proximity sensor 123 or 125 is detected, the card type terminal 10 according to an embodiment controls, for example, switching (in other words, switching of the screen) of an item between different levels as indicated by a reference numeral g21. Also, it is not necessary to provide both of the proximity sensors 123 or 125 separately, and the tap operation with respect to either sensor may be used as the tap operation with respect to any of the plurality of proximity sensors 121.

In addition, when the selected level is switched, the card type terminal 10 according to an embodiment controls display of hierarchical information v51 on a screen according to the selected level, and identifiably presents the selected level to the user.

For example, as exemplified in FIG. 5, when the topmost level g11 is selected, the card type terminal 10 does not display the hierarchical information v51 on the screen. That is, when no hierarchical information v51 is displayed, it represents a state in which the topmost level g11 is selected.

In addition, when a level other than the topmost level g11 is selected, the card type terminal 10 presents the hierarchical information v51 on the screen displayed on the display unit 13 according to a moving distance (in other words, a depth of the level) in a hierarchical direction from the level g11.

As a specific example, while the level g12 directly below the topmost level g11 is selected, the card type terminal 10 presents the hierarchical information v51 formed of one icon. Accordingly, the card type terminal 10 shows the user the fact that a level (that is, the level g12) positioned only one level below the level g11 is selected.

Similarly, when the level g13 that is positioned only two levels below the topmost level g1 is selected, the card type terminal 10 presents the hierarchical information v51 formed of two icons. Accordingly, the card type terminal 10 shows the user the fact that a level (that is, the level g13) positioned only two levels below the level g11 is selected.

As described above, the card type terminal 10 according to an embodiment classifies various pieces of information presented to the user as a plurality of items, divides various pieces of information classified as each item into a plurality of levels to form a so-called tree structure, and further classifies information for each level. Then, the card type terminal 10 associates different operations such as the swipe operation and the tap operation with a process of switching between levels and switching the item that is divided in the selected level, and switches the screen (display item) in response to the operation.

In addition, the card type terminal 10 according to an embodiment controls display of the hierarchical information v51 on a screen according to the selected level and identifiably presents the selected level to the user.

According to such a configuration, when the user appropriately selects a desired item while switching a screen according to each operation, he or she can intuitively recognize a relation between items corresponding to screens. Therefore, as in the card type terminal 10 according to an embodiment, even when a size of the display unit 13 is restricted and an amount of information that may be presented at the same time is limited, it is possible to present information efficiently.

Also, if switching to a higher level is designated based on the tap operation with respect to the proximity sensor 125 while the topmost level g11 is selected, the card type terminal 10 may not perform switching of the level. In such a case, the card type terminal 10 may notify the user that screen transition is no longer possible by a screen effect such as vibrating the screen or changing a display form. This is similar to when switch to the lower level is designated based on the tap operation with respect to the proximity sensor 123 while a bottommost level is selected.

In addition, this is similar to when the screen displayed on the display unit 13 is switched to the screen corresponding to each item included in the selected level by the swipe operation. For example, as exemplified in FIG. 5, when the level g11 is selected by the swipe operation with respect to the operation unit 12 in a predetermined direction, the screen displayed on the display unit 13 is sequentially switched to the screens v11, v21, and v41, in an upward direction in FIG. 5. Also, in this case, the screen v41 is assumed to correspond to an end of switching of the screen in an upward direction in FIG. 5.

In this case, if switching of the screen in the upward direction in FIG. 5 is designated while the screen v41 is displayed on the display unit 13, the card type terminal 10 may notify the user that screen transition is no longer possible by a screen effect such as vibrating the screen or changing a display form.

However, the above process is only an example. By enabling screen switching between the screen v41 and the screen v31 in FIG. 5, the card type terminal 10 may cyclically switch the screens v11, v21, v31, and v41.

In addition, when switching from a lower level to a higher level is performed, switching is not limited to one level but may be performed over a plurality of levels. As a specific example, when a predetermined operation (for example, an operation of pressing and holding with respect to a predetermined proximity sensor) with respect to the operation unit 12 is detected, the card type terminal 10 may switch the selected level to the topmost level. Also, in this case, the card type terminal 10 preferably displays a screen corresponding to an item that is positioned above the level before switching among items that are divided in the topmost level. That is, when the selected level is switched, the card type terminal 10 preferably limits a candidate of the level to be switched to only a level that may be reached when a level is moved from a level before switching in any of an upward direction and a downward direction.

Exemplary control in which the card type terminal 10 according to an embodiment displays the screen on the display unit 13 and thus information is presented to the user has been described above with reference to FIGS. 4 and 5. As described above, when display control of the card type terminal 10 according to an embodiment is applied to the information processing apparatus having the input and output interface (in particular, the display unit) of a restricted size, it is possible to present information to the user more appropriately. On the other hand, it is needless to say that the above-described display control may be applied to any terminal without limitation to a card type terminal such as the card type terminal 10.

4. FUNCTIONAL CONFIGURATION

Next, an exemplary functional configuration of the card type terminal 10 according to an embodiment will be described with reference to FIG. 6. FIG. 6 is a block diagram illustrating the exemplary functional configuration of the card type terminal 10 according to an embodiment.

As illustrated in FIG. 6, the card type terminal 10 according to an embodiment includes the operation unit 12, the display unit 13, the notification unit 15, the first communication unit 171, the second communication unit 172, a storage unit 18, a power supply unit 19, and a control unit 100. In addition, the control unit 100 includes a communication control unit 101, a calculation unit 103, an input analyzing unit 105, and an input and output control unit 107. Since the operation unit 12, the display unit 13, and the notification unit 15 illustrated in FIG. 6 are the same as the operation unit 12, the display unit 13, and the notification unit 15 that have been described with reference to FIGS. 2 and 3, details thereof will not be described.

The first communication unit 171 establishes the network n1 with the reader/writer 80, and is configured for each component in the card type terminal 10 to transmit and receive data via the network n1. The first communication unit 171 may be configured as, for example, a communication device using contactless short-range wireless communication technology such as NFC or RFID.

Also, in the following, when each component in the card type terminal 10 transmits and receives data to and from the reader/writer 80 via the network n1, data is assumed to be transmitted and received through the first communication unit 171 even if this is not specifically described.

In addition, the second communication unit 172 establishes the network n2 with the information processing terminal 90, and is configured for each component in the card type terminal 10 to transmit and receive data via the network n2. The second communication unit 172 may be configured as a communication device for implementing wireless communication, for example, communication based on IEEE 802.15 standards such as Bluetooth (registered trademark) standards, communication based on IEEE 802.11 standards such as Wi-Fi (registered trademark), and the like.

Also, in the following, when each component in the card type terminal 10 transmits and receives data to and from the information processing terminal 90 via the network n2, data is assumed to be transmitted and received through the second communication unit 172 even if this is not specifically described.

The storage unit 18 is a storage unit configured to store information that is obtained by the card type terminal 10 from the external device via the network n1 or n2. Examples of information stored in the storage unit 18 include a so-called electronic value such as a coupon or electronic money, various pieces of authentication information, and the like.

In order to operate each component in the card type terminal 10 (for example, the operation unit 12, the display unit 13, the notification unit 15, the first communication unit 171, the second communication unit 172, and the control unit 100), the power supply unit 19 supplies power to each component. The power supply unit 19 may be configured as, for example, a power device for supplying power such as a battery. Also, the power supply unit 19 may be configured such that an antenna for contactless power supply is provided and thus power may be charged by contactless power supply through the antenna.

The communication control unit 101 controls communication with the external device via each of the networks n1 and n2.

For example, when a state in which communication with the reader/writer 80 via the network n1 is possible is detected, the communication control unit 101 executes a predetermined communication sequence with the reader/writer 80, and establishes the network n1. Similarly, when a state in which communication with the information processing terminal 90 via the network n2 is possible is detected, the communication control unit 101 executes a predetermined communication sequence with the information processing terminal 90, and establishes the network n2. Also, it is needless to say that, as long as the communication control unit 101 is able to detect a state in which communication with the external device is possible via each of the networks n1 and n2, a method thereof is not specifically limited. As a specific example, the communication control unit 101 may perform polling on the external device for each predetermined timing via each of the networks n1 and n2 and thus recognize whether communication with the external device is possible via each network.

In addition, the communication control unit 101 may temporarily stop an operation of the first communication unit 171 according to an instruction from the user through the operation unit 12 and thus temporarily disable communication with the reader/writer 80 via the network n1. Similarly, the communication control unit 101 may temporarily stop an operation of the second communication unit 172 according to an instruction from the user through the operation unit 12 and thus temporarily disable communication with the information processing terminal 90 via the network n2. Also, it is needless to say that the communication control unit 101 may enable disabled communication again according to an instruction from the user through the operation unit 12.

An operation screen for instructing enabling or disabling of communication via each of the networks n1 and n2 may be provided, for example, in a level below an item showing "Setting" associated with the screen v21 among items illustrated in FIG. 5.

In addition, without being limited to the instruction from the user, the communication control unit 101 may disable or enable communication with the external device via each of the networks n1 and n2 according to a state of the card type terminal 10. As a specific example, when communication is performed via either of the networks n1 and n2, the communication control unit 101 may temporarily disable communication via the other network. In addition, as another example, when power supplied from the power supply unit 19 falls below than a predetermined value (for example, when the remaining power amount is lower than a predetermined value), the communication control unit 101 may temporarily disable communication via either or both of the networks n1 and n2.

The input analyzing unit 105 sequentially obtains the detection result of the operating body from the operation unit 12, and recognizes content of the user's operation with respect to the operation unit 12 according to the obtained detection result. As a specific example, the input analyzing unit 105 recognizes that the swipe operation is performed in the direction P11 along an arcuate axis according to the detection result of each of the plurality of proximity sensors 121 illustrated in FIG. 3, and recognizes a swipe direction of the swipe operation.

In addition, as another example, the input analyzing unit 105 recognizes that the tap operation is performed with respect to the proximity sensor 123 according to the detection result of the proximity sensor 123. Similarly, the input analyzing unit 105 recognizes that the tap operation is performed with respect to the proximity sensor 125 according to the detection result of the proximity sensor 125.

As described above, the input analyzing unit 105 recognizes content of an operation with respect to the operation unit 12 and notifies the input and output control unit 107 of the content of the recognized operation.

The input and output control unit 107 displays a screen corresponding to a currently selected item among items that are divided into a plurality of levels as illustrated in FIG. 5 on the display unit 13.

In addition, the input and output control unit 107 switches the currently selected item and the level (that is, the currently selected level) to which the item belongs according to the operation content notified of by the input analyzing unit 105.

As a specific example, when the swipe operation is notified of as the operation content by the input analyzing unit 105, the input and output control unit 107 recognizes that an operation (that is, an operation of switching the display item) of switching to another item in the selected level is performed.

In this case, the input and output control unit 107 switches the currently selected item to another item in the currently selected level according to a direction of the swipe operation. In this case, the input and output control unit 107 fades the screen displayed on the display unit 13 out in conjunction with the swipe operation in a scrolling manner and fades a screen corresponding to another item after switching in on the display unit 13 in conjunction with the swipe operation in a scrolling manner. Accordingly, the screen corresponding to another item after switching is displayed on the display unit 13.

In addition, as another example, when the tap operation with respect to the proximity sensor 123 is notified of as the operation content by the input analyzing unit 105, the input and output control unit 107 recognizes that an operation of moving to a lower level is performed.

In this case, the input and output control unit 107 switches the currently selected level to a level directly below the currently selected item, and switches the currently selected item to another item that is classified into a level after switching. Then, the input and output control unit 107 displays a screen corresponding to another item after switching on the display unit 13. Accordingly, the display unit 13 displays another item that is classified into a level below the item before switching, that is, a screen corresponding to any item among items that are obtained by further classifying the item before switching.

In addition, when the tap operation with respect to the proximity sensor 125 is notified of as the operation content by the input analyzing unit 105, the input and output control unit 107 recognizes that an operation of moving to an upper level is performed.

In this case, the input and output control unit 107 switches the currently selected level to a level directly above the currently selected item, and switches the currently selected item to another item directly above the item. Then, the input and output control unit 107 displays the screen corresponding to another item after switching on the display unit 13. Accordingly, the display unit 13 displays a screen corresponding to another item that is classified into a level above the item before switching.

In addition, the input and output control unit 107 displays the hierarchical information v51 corresponding to the level after switching on the screen after switching, according to switching of the selected level. When the hierarchical information v51 is displayed on the screen in this manner, it is possible for the user to intuitively recognize the currently selected level.

In addition, by associating a screen corresponding to a predetermined item and a predetermined operation with a predetermined function, the input and output control unit 107 may perform control such that the predetermined function is executed when the operation is recognized while the screen is displayed on the display unit 13.

As a specific example, the input and output control unit 107 may associate an item related to control of settings of the network n1 and the tap operation with respect to the proximity sensor 123 with a function of switching activation of the network n1. That is, while a screen corresponding to the item related to control of settings of the network n1 is displayed on the display unit 13, when the tap operation with respect to the proximity sensor 123 is received, the input and output control unit 107 may perform control such that the communication control unit 101 enables or disables the network n1.

Of course, it is needless to say that, by associating the operation of switching the display item or an operation other than the operation of level moving with a predetermined function, the input and output control unit 107 may perform control such that the predetermined function is executed when the operation is recognized.

In addition, the input and output control unit 107 may temporarily restrict some or all operations of the operation unit 12 according to a state of the card type terminal 10. As a specific example, when communication with the reader/writer 80 is established via the network n1, the input and output control unit 107 may temporarily restrict operations of the operation unit 12. According to such a configuration, for example, when a device that is easily influenced by a magnetic field is used as a device constituting the operation unit 12, it is possible to prevent a malfunction of the operation unit 12 due to generation of a magnetic field according to contactless short-range wireless communication.

The calculation unit 103 controls output or update of various pieces of information stored in the storage unit 18 based on communication with the external device via the networks n1 and n2. As a specific example, the calculation unit 103 obtains an electronic value from the information processing terminal 90 via the network n2 and stores the obtained electronic value in the storage unit 18.

In addition, as another example, the calculation unit 103 reads the electronic value stored in the storage unit 18 in response to a request from the reader/writer 80 via the network n1 and transmits the read electronic value to the reader/writer 80. In this case, the calculation unit 103 may obtain the payment result according to the transmitted electronic value from the reader/writer 80 as payment information, and store the obtained payment information in the storage unit 18. Also, the calculation unit 103 may output the payment information stored in the storage unit 18 to the information processing terminal 90 via the network n2.

The exemplary functional configuration of the card type terminal 10 according to an embodiment has been described above with reference to FIG. 6.

5. PROCESS

Next, an exemplary series of operations of the card type terminal 10 according to an embodiment will be described with reference to FIG. 7, particularly focusing on control of screen switching by the card type terminal 10. FIG. 7 is a flowchart illustrating an exemplary series of operations of the card type terminal 10 according to an embodiment.

(Step S101)

Each of the proximity sensors 121, 123, and 125 of the operation unit 12 detects contact or approach of the operating body and notifies the input analyzing unit 105 of the detection result.

(Step S103)

The input analyzing unit 105 sequentially obtains the detection result of the operating body from the operation unit 12, and recognizes content of the user's operation with respect to the operation unit 12 according to the obtained detection result. As a specific example, the input analyzing unit 105 recognizes that the swipe operation is performed in the direction P11 along an arcuate axis according to the detection result of each of the plurality of proximity sensors 121 illustrated in FIG. 3, and recognizes a swipe direction of the swipe operation.

In addition, as another example, the input analyzing unit 105 recognizes that the tap operation is performed with respect to the proximity sensor 123 according to the detection result of the proximity sensor 123. Similarly, the input analyzing unit 105 recognizes that the tap operation is performed with respect to the proximity sensor 125 according to the detection result of the proximity sensor 125.

As described above, the input analyzing unit 105 recognizes content of an operation with respect to the operation unit 12 and notifies the input and output control unit 107 of the content of the recognized operation.

The input and output control unit 107 displays a screen corresponding to a currently selected item among items that are divided into a plurality of levels as illustrated in FIG. 5 on the display unit 13.

In addition, the input and output control unit 107 switches the currently selected item and the level (that is, the currently selected level) to which the item belongs according to the operation content notified of by the input analyzing unit 105, and displays a screen corresponding to the switched item on the display unit 13.

(Step S107)

As a specific example, when the swipe operation is notified of as the operation content by the input analyzing unit 105, the input and output control unit 107 recognizes that an operation (that is, an operation of switching the display item) of switching to another item in the selected level is performed (Yes in step S105).

In this case, the input and output control unit 107 switches the currently selected item to another item in the currently selected level according to a direction of the swipe operation. In this case, the input and output control unit 107 fades the screen displayed on the display unit 13 out in conjunction with the swipe operation in a scrolling manner and fades a screen corresponding to another item after switching in on the display unit 13 in conjunction with the swipe operation in a scrolling manner. Accordingly, the screen corresponding to another item after switching is displayed on the display unit 13.

(Step S111)

In addition, as another example, when the tap operation with respect to the proximity sensor 123 is notified of as the operation content by the input analyzing unit 105 (No in step S105), the input and output control unit 107 recognizes that an operation of moving to a lower level is performed (Yes in step S109).

In this case, the input and output control unit 107 switches the currently selected level to a level directly below the currently selected item, and switches the currently selected item to another item that is classified into a level after switching. Then, the input and output control unit 107 displays a screen corresponding to another item after switching on the display unit 13. Accordingly, the display unit 13 displays another item that is classified into a level below the item before switching, that is, a screen corresponding to any item among items that are obtained by further classifying the item before switching.

Similarly, when the tap operation with respect to the proximity sensor 125 is notified of as the operation content by the input analyzing unit 105 (No in step S105), the input and output control unit 107 recognizes that an operation of moving to an upper level is performed (Yes in step S109).

In this case, the input and output control unit 107 switches the currently selected level to a level directly above the currently selected item, and switches the currently selected item to another item directly above the item. Then, the input and output control unit 107 displays the screen corresponding to another item after switching on the display unit 13. Accordingly, the display unit 13 displays a screen corresponding to another item that is classified into a level above the item before switching.

(Step S113)

In addition, by associating a screen corresponding to a predetermined item and a predetermined operation with a predetermined function, the input and output control unit 107 may perform control such that the predetermined function is executed when the operation is recognized while the screen is displayed on the display unit 13.

As a specific example, the input and output control unit 107 may associate an item related to control of settings of the network n1 and the tap operation with respect to the proximity sensor 123 with a function of switching activation of the network n1. That is, while a screen corresponding to the item related to control of settings of the network n1 is displayed on the display unit 13, when the tap operation with respect to the proximity sensor 123 is received, the input and output control unit 107 may perform control such that the communication control unit 101 enables or disables the network n1.

Of course, it is needless to say that, by associating the operation of switching the display item or an operation other than the operation of level moving with a predetermined function, the input and output control unit 107 may perform control such that the predetermined function is executed when the operation is recognized. Also, when these operations are received (NO in step S109), the card type terminal may execute a function associated with the operation in advance by the input and output control unit 107.

(Step S115)

As described above, until an end (for example, stop of the card type terminal 10 or the like) of the series of processes is instructed (NO in step S115), the card type terminal 10 recognizes an operation with respect to the operation unit 12, and controls display of the screen on the display unit 13 according to the recognized operation. Then, when the end of the series of processes is instructed (YES in step S115), the card type terminal 10 ends reception of an operation through the operation unit 12 and display control of the screen on the display unit 13 according to content of the operation.

The exemplary series of operations of the card type terminal 10 according to an embodiment has been described above with reference to FIG. 7, particularly focusing on control of screen switching by the card type terminal 10.

6. EXAMPLES

6.1. Example 1: Exemplary Usage Form of Card Type Terminal

Next, an exemplary usage form of the card type terminal 10 according to an embodiment will be described, focusing on operations of the information processing system according to an embodiment, as an example.

6.1.1. Example 1-1: Obtaining Information from External Device and Using the Information First, as Example 1-1, an example in which the card type terminal 10 obtains information from the external device such as the information processing terminal 90, and uses the obtained information to communicate with the reader/writer 80 will be described with reference to FIG. 8. FIG. 8 is a diagram illustrating an overview of operations of an information processing system according to Example 1-1. FIG. 8 illustrates an example in which the card type terminal 10 obtains a coupon from the external device such as the information processing terminal 90 and uses the obtained coupon to communicate with the reader/writer 80.

As illustrated in FIG. 8, the card type terminal 10 obtains a coupon d11 from the external device such as the information processing terminal 90 via, for example, the network n2 based on communication standards such as Bluetooth (registered trademark) or Wi-Fi (registered trademark), and stores the coupon in its own storage unit. Also, the card type terminal 10 may present information on the coupon d11 stored in the storage unit to the user through the display unit 13.

In addition, for example, when the network n2 based on communication standards such as "Bluetooth Low Energy" is used, the card type terminal 10 may obtain the coupon d11 that is broadcast from a predetermined delivery point. In this case, the card type terminal 10 may execute a predetermined communication sequence with the delivery point that is detected by entering a communication area of the delivery point and establish the network n2, and obtain the coupon d11 via the network n2.

In addition, when communication is performed with the reader/writer 80 via the network n1, the card type terminal 10 may transmit the coupon d11 stored in the storage unit to the reader/writer 80 based on an instruction from the user through the operation unit 12.

According to such a configuration, the user may take, for example, the coupon d11 transmitted from the external device such as the information processing terminal 90 or the delivery point in the card type terminal 10, and use the coupon d11 when the card type terminal 10 is used for payment.

Also, the card type terminal 10 may be configured to obtain a benefit d13 resulting from the use of the coupon d11 from the reader/writer 80 as electronic data. Also, the term "benefit" generally refers to incentives that are provided to consumers as general promotional techniques in commerce.

As a specific example, the card type terminal 10 may obtain another coupon from the reader/writer 80 as the benefit d13.

In addition, as another example, the card type terminal 10 may obtain points for receiving a point service as the benefit d13 from the reader/writer 80. Also, the term "point service" includes a service in which points are added according to an amount of money spent, a usage situation or the like and a benefit such as a free gift or a discount is received in exchange for a certain number of points.

Also, the card type terminal 10 may store the obtained benefit d13 in its own storage unit. According to such a configuration, for example, the card type terminal 10 may output the benefit d13 stored in the storage unit to the external device such as the information processing terminal 90 via the network n2. In addition, as another example, the card type terminal 10 may use the benefit d13 stored in the storage unit to communicate (for example, payment) with another reader/writer 80 via the network n1.

As described above in Example 1-1, the card type terminal 10 may be configured to obtain information (for example, the coupon d11) from the external device via the network n2 and use the obtained information to communicate (for example, payment) with the reader/writer 80 via the network n1. Also, in this case, the card type terminal 10 may present the obtained information to the user through the display unit 13. In addition, the card type terminal 10 may be configured to switch between use and nonuse of the obtained information according to the user's designation through the operation unit 12 and be able to select information to be used from among a plurality of pieces of obtained information.

6.1.2. Example 1-2: Output Information to External Device

Next, as Example 1-2, an example in which the card type terminal 10 outputs information obtained based on communication with the reader/writer 80 to the external device such as the information processing terminal 90 will be described with reference to FIG. 9. FIG. 9 is a diagram illustrating an overview of operations of an information processing system according to Example 1-2. FIG. 9 illustrates an example in which the card type terminal 10 outputs payment information based on communication with the reader/writer 80 to the external device such as the information processing terminal 90.

As illustrated in FIG. 9, the card type terminal 10 records information on payment performed based on communication with the reader/writer 80 via the network n2 as a history. Also, the recorded payment information may be described below as "payment information d21."

In addition, when the network n2 is established with the information processing terminal 90, the card type terminal 10 may transmit the payment information d21 stored in its own storage unit to the information processing terminal 90 via the network n2.

According to such a configuration, the user may manage, for example, content of payment using the card type terminal 10 in the information processing terminal 90 capable of operating a more versatile application.

In addition, when the payment information d21 is managed in the information processing terminal 90 such as a smartphone, for example, the information processing terminal 90 may associate the payment information d21 with information obtained via the internet. It is needless to say that the information processing terminal 90 may transmit the payment information d21 associated with the information obtained via the Internet to the card type terminal 10 again via the network n2.

In addition, when the network n2 is established between the card type terminal 10 and the information processing terminal 90, the card type terminal 10 may use communication with the reader/writer 80 as a trigger and push transmit the payment information d21 based on the communication to the information processing terminal 90.

Accordingly, for example, even when unauthorized payment is performed at a timing unintended by the user due to skimming or the like, the user may immediately recognize that the unauthorized payment is performed based on information of which the card type terminal 10 has notified the information processing terminal 90.

As described above in Example 1-2, the card type terminal 10 may be configured to output information obtained based on communication with the reader/writer 80 via the network n2 to the external device such as the information processing terminal 90 via the network n1. Also, in this case, it is needless to say that the card type terminal 10 may present the obtained information to the user through the display unit 13.

6.2. Example 2: Exemplary Method of Presenting Hierarchical Information

Next, as Example 2, an exemplary method of presenting hierarchical information will be described. As described above with reference to FIG. 5, the card type terminal 10 according to an embodiment controls display of hierarchical information on the screen according to the selected level, and thus identifiably presents the selected level to the user. For example, as exemplified in FIG. 5, the card type terminal 10 presents a position (in other words, a depth of the level) of the currently selected level using the number of icons to be displayed as hierarchical information.

On the other hand, as long as the selected level is identifiable, a method of presenting hierarchical information is not necessarily limited to the presenting method using icons as illustrated in FIG. 5. Therefore, an exemplary method of presenting hierarchical information different from the example illustrated in FIG. 5 will be described below as Example 2.

For example, FIG. 10 is a diagram illustrating an exemplary method of presenting hierarchical information. As exemplified in FIG. 10, the card type terminal 10 presents a number on the screen displayed on the display unit 13 as hierarchical information v53. The number indicates a moving distance (in other words, a depth of the level) in a hierarchical direction from the topmost level g11 to the selected level.

For example, like when the screen v121 is displayed, when the level g12 directly below the topmost level g11 is selected, the card type terminal 10 presents the number "1" indicating that a level is positioned one level below the level g11 as the hierarchical information v53. In addition, like when the screen v13 is displayed, when the level g13 positioned only two levels below the topmost level g11 is selected, the card type terminal 10 presents the number "2" indicating that a level is positioned two levels below the level g11 as the hierarchical information v53.

Also, as exemplified in FIG. 10, like when the screen v11 is displayed, when the topmost level g11 is selected, the card type terminal 10 presents no hierarchical information v53, but the present disclosure is not necessarily limited thereto. As a specific example, while the topmost level g11 is selected, the card type terminal 10 may present the number "0" as the hierarchical information v53 as information indicating that a current level is the level g11.

In addition, as another example, the card type terminal 10 may present hierarchical information such that each item classified into the level is identifiable in addition to the selected level. For example, FIG. 11 is a diagram illustrating an exemplary method of presenting hierarchical information, and illustrates an exemplary method of presenting hierarchical information such that each item classified into the level is identifiable in addition to the selected level.

As exemplified in FIG. 11, the card type terminal 10 presents a two-digit number as hierarchical information v55. In the two-digit number presented as the hierarchical information v55, the tens digit represents the selected level. In addition, in the two-digit number, the ones digit represents the currently selected item (that is, an item whose screen is displayed on the display unit 13) among items that are classified into the level (that is, the selected level) represented by the tens digit.

As a specific example, items corresponding to the screens v121 and v122 are classified into the level g12 directly below an item corresponding to the screen v11 that is classified into the topmost level g11. Therefore, in the two-digit number presented as the hierarchical information v55 on the screens v121 and v122, the tens digit represents the number "1" indicating that a level is positioned one level below the level g11. In addition, in the two-digit number presented as the hierarchical information v55 on the screens v121 and v122, the ones digit is differently represented as "1" or "2" such that an item corresponding to each screen is identifiable.

According to such a configuration, the card type terminal 10 may present hierarchical information to the user such that each item classified into the level is identifiable, in addition to the selected level.

As Example 2, the exemplary method of presenting hierarchical information has been described above with reference to FIGS. 10 and 11. However, the above-described method is only an example. As long as the selected level may be identifiably presented to the user, a form of hierarchical information or a method of presenting it is not necessarily limited to the above example. As a specific example, the card type terminal 10 may present hierarchical information through a notification device different from the display unit 13, for example, an acoustic device such as a speaker, or a light emitting unit such as an LED.

6.3. Example 3: Exemplary Method of Presenting Information

Next, as Example 3, an exemplary method of the card type terminal 10 according to an embodiment presenting various pieces of information to the user by switching the screen displayed on the display unit 13 will be described together with a relation between screens (between items).

For example, FIG. 12 is a diagram illustrating an exemplary method of presenting information according to Example 3 and illustrates an exemplary method of the card type terminal 10 presenting various pieces of information to the user.

As exemplified in FIG. 12, when the level g13 directly below an item of "Money A" corresponding to the screen v121 is selected, first, the card type terminal 10 displays a screen v131 in which a usage history of "Money A" is presented as text information on the display unit 13. When the swipe operation is detected in this state, the card type terminal 10 switches the screen v131 to another screen v132 or v133 in which the usage history of "Money A" is presented in a different form, according to a direction of the swipe operation. For example, as exemplified in FIG. 12, the card type terminal 10 presents a graph of the usage history of "Money A" on the screens v132 and v133.

Similarly, FIG. 13 is a diagram illustrating an exemplary method of presenting information according to Example 3 and illustrates an exemplary method of the card type terminal 10 presenting various pieces of information to the user.

As exemplified in FIG. 13, when a level g42 directly below an item "ID" corresponding to the screen v41 is selected, first, the card type terminal 10 displays a screen v421 in which owner information of the card type terminal 10 is presented as text information on the display unit 13. In this state, when the swipe operation is detected, the card type terminal 10 switches the screen v421 to another screen v422 or v423 in which the owner information is presented in a different form from text information.

For example, the screen v422 presents the owner's picture as owner information of the card type terminal 10. In addition, the screen v423 presents owner information of the card type terminal 10 as coded information such as a 2D barcode.

As described above with reference to FIGS. 12 and 13, the card type terminal 10 may assign information presented in a different form to a different screen, receive the swipe operation with respect to the operation unit 12, and switch between the screens. According to such a configuration, even when a size of the display unit 13 is restricted and an amount of information that can be presented at the same time is limited as the card type terminal 10 according to an embodiment, it is possible to present various pieces of information to the user in various forms.

In addition, as described above, in the card type terminal 10 according to an embodiment, a circuit group for implementing various functions may be integrated as an IC chip. Therefore, when information is presented on the display unit 13, the card type terminal 10 may execute predetermined arithmetic processing to dynamically switch the information.

For example, FIG. 14 is a diagram illustrating an exemplary method of presenting information according to Example 3, and illustrates an example in which the card type terminal 10 dynamically switches information to be presented based on the predetermined arithmetic processing. The example illustrated in FIG. 14 shows a case in which the card type terminal 10 switches between screens v721 to v723 corresponding to items of "Coupon A" to "Coupon C," respectively, that are divided in a level g72 directly below an item "Coupon" corresponding to a screen v71 according to the swipe operation with respect to the operation unit 12.

In addition, as exemplified in FIG. 14, the card type terminal 10 includes a timer unit configured to measure time, and dynamically switches information to be presented to the user through the screens v721 to v723 according to time information notified of by the timer unit.

As a specific example, the card type terminal 10 presents a period until an expiration date on which "Coupon A" expires on the screen v721. In this case, the card type terminal 10 may compare information representing the expiration date of the obtained "Coupon A" with time information representing a current time notified of by the timer unit, calculate a remaining period until the expiration date, and present the calculated period on the screen v721.

In addition, as another example, the card type terminal 10 presents a period until "Coupon B" becomes valid on the screen v722. In this case, the card type terminal may compare information representing a start date of a validity period of the obtained "Coupon B" with time information representing a current time notified of by the timer unit, calculate a remaining period until the start date of the validity period, and present the calculated period on the screen v722.

In addition, as shown on the screen v723, the card type terminal 10 may identify whether the validity period of the coupon is over, and notify the user of termination when the validity period has expired. As a specific example, the card type terminal may compare information representing a validity period of the obtained "Coupon C" with time information representing a current time notified of by the timer unit, and recognize whether the validity period has already expired. Then, when expiration of the validity period of the "Coupon C" is recognized, the card type terminal 10 may present the fact that the validity period of the "Coupon C" has expired on the screen v723.

In addition, as shown on a screen v724, the card type terminal 10 may present a benefit obtained when a corresponding coupon is used. As a specific example, the card type terminal 10 may present information representing the obtained benefit (or information for obtaining the benefit) based on payment using the obtained "Coupon D" on the screen v724. Also, as exemplified in FIG. 14, the card type terminal 10 presents information representing the benefit as coded information such as a barcode.

The exemplary method of the card type terminal 10 according to an embodiment presenting various pieces of information to the user by switching the screen displayed on the display unit 13 has been described above as Example 3 with reference to FIGS. 12 to 14.

7. MODIFICATION

Next, as the modification, an exemplary configuration of the operation unit 12 according to an embodiment will be described. In the example described with reference to FIG. 3, the operation unit 12 is provided assuming that the user will operate the operation unit 12 with his or her right thumb while gripping the card type terminal 10 with his or her right hand. However, the modification describes an exemplary configuration of the operation unit 12 in which the operation unit 12 may be operated with the thumb of the hand gripping the card type terminal 10 regardless of whether the user grips the card type terminal 10 with his or her right hand or left hand.

For example, FIG. 15 is a diagram illustrating an exemplary configuration of the operation unit 12 according to the modification. Also, in the following, when the card type terminal 10 according to the modification is explicitly distinguished from the card type terminal 10 (refer to FIG. 3) according to above-described embodiments, it is described as a "card type terminal 10a."

As illustrated in FIG. 15, in the card type terminal 10a according to the modification, the operation surfaces of the operation units 12a and 12b are provided in areas different from the display surface of the display unit 13 on the upper surface 11. Also, as exemplified in FIG. 15, when the operation units 12a and 12b are simplified and illustrated, each of the operation units 12a and 12b includes the plurality of proximity sensors 121 and the proximity sensors 123 and 125, similar to the operation unit 12 illustrated in FIG. 3.

In FIG. 15, the operation unit 12a corresponds to the operation unit 12 illustrated in FIG. 3. That is, the operation unit 12a is capable of detecting a change in the position of the operating body in the direction P11 along an arcuate axis on the operation surface. In addition, as exemplified in FIG. 15, the direction P1 along an arcuate axis is set such that a center P10 of the arc is positioned on the right with respect to an axis P2 that divides the upper surface 11 (in other words, the operation surface of the operation unit 12) into left and right in the x direction, and the arc is positioned on the left with respect to the center P10.

Therefore, similar to the example illustrated in FIG. 3, when the user grips the card type terminal 10a with his or her right hand, the direction P11 along an arcuate axis is set in a moving direction of the right thumb. According to such a configuration, the card type terminal 10a is able to detect the swipe operation by the right thumb when the user grips the card type terminal 10a with his or her right hand.

In addition, the operation unit 12b has the same configuration as the operation unit 12a and is provided to be symmetric with the operation unit 12b. That is, the operation unit 12b is capable of detecting a change in the position of the operating body in the direction P13 along an arcuate axis on the operation surface. In addition, as exemplified in FIG. 15, the direction P13 along an arcuate axis is set such that a center P12 of the arc is positioned on the left with respect to an axis P2 that divides the upper surface 11 into left and right in the x direction, and the arc is positioned on the right with respect to the center P12.

Therefore, when the user grips the card type terminal 10a with his or her left hand, the direction P13 along an arcuate axis is set in a moving direction of the left thumb. According to such a configuration, the card type terminal 10a is able to detect the swipe operation by the left thumb when the user grips the card type terminal 10a with his or her left hand.

Also, in the card type terminal 10a illustrated in FIG. 15, the operation surface of the operation unit 12a and the operation surface of the operation unit 12b are provided to cross each other in an X-shape.

According to such a configuration, regardless of whether the user grips the card type terminal 10a with his or her right hand or left hand, the operation unit 12 may be operated with the thumb of the hand gripping the card type terminal 10a.

Also, regardless of whether the user grips the card type terminal 10a with his or her right hand or left hand, as long as the operation unit 12 may be operated with the thumb of the hand gripping the card type terminal 10a, a positional relation between the operation units 12a and 12b is not limited to the example illustrated in FIG. 15.

For example, FIG. 16 is a diagram illustrating another exemplary configuration of the operation unit 12 according to the modification and illustrates another example of the card type terminal 10a according to the modification. In the card type terminal 10a illustrated in FIG. 16, the operation surface of the operation unit 12a and the operation surface of the operation unit 12b are provided in an inverted V shape. As illustrated in FIG. 16, the operation surface of the operation unit 12a and the operation surface of the operation unit 12b may not necessarily be provided so as to cross each other.

In addition, it is needless to say that a relative positional relation between the operation surface of the operation unit 12a and the operation surface of the operation unit 12b may be adjusted according to an assumed relative size of the user's hand with respect to the case of the card type terminal 10.

Also, as illustrated in FIGS. 15 and 16, the card type terminal 10a includes the operation units 12a and 12b and may enable, for example, only one of the units based on previous settings. Specifically, when the user sets an operation with the right hand, the card type terminal 10a may enable only the operation unit 12a between the operation units 12a and 12b. Similarly, when the user sets an operation with the left hand, the card type terminal 10a may enable only the operation unit 12b between the operation units 12a and 12b.

Of course, it is needless to say that the card type terminal 10a may always enable both of the operation units 12a and 12b. In this case, the card type terminal 10a may recognize a direction of the swipe operation according to detection of contact or approach of the operating body by each of the proximity sensors 121 of either of the operation units 12a and 12b.

In addition, as another example, the card type terminal 10a may assign different functions to the swipe operation in the direction P11 along an arcuate axis illustrated in FIG. 15 and the swipe operation in the direction P13 along an arcuate axis.

As a specific example, when the swipe operation in the direction P11 along an arcuate axis is detected, the card type terminal 10a switches a screen displayed on the display unit 13 to a screen corresponding to another item, similar to the card type terminal 10 illustrated in FIG. 4. On the other hand, when the swipe operation in the direction P13 along an arcuate axis is detected, the card type terminal 10a may switch, for example, a display form of the screen displayed on the display unit 13. It is needless to say that the exemplary setting presented in the present description is only an example, and the present disclosure is not limited to the setting.

The exemplary configuration of the card type terminal 10a according to the modification has been described above with reference to FIGS. 15 and 16. As illustrated in FIGS. 15 and 16, the operation units 12a and 12b are provided. Therefore, regardless of whether the user grips the card type terminal 10a with his or her right hand or left hand, the operation unit 12 may be operated with the thumb of the hand gripping the card type terminal 10a.

8. HARDWARE CONFIGURATION

Next, an exemplary hardware configuration of the card type terminal 10 according to an embodiment of the present disclosure will be described with reference to FIG. 17. FIG.

17 is a diagram illustrating an exemplary hardware configuration of the card type terminal 10 according to an embodiment of the present disclosure.

As illustrated in FIG. 17, the card type terminal 10 according to an embodiment includes a processor 901, a memory 903, a storage 905, an operation device 907, a display device 909, a notification device 911, a first communication device 913, a second communication device 915, and a bus 917.

The processor 901 may include, for example, a central processing unit (CPU), a graphics processing unit (GPU), a digital signal processor (DSP), or a system on chip (SoC), and execute various processes of the card type terminal 10. The processor 901 may be configured by, for example, an electronic circuit for executing various types of arithmetic processing. Also, each component of the control unit 100 described above may be implemented by the processor 901.

The memory 903 includes a random access memory (RAM) and a read only memory (ROM), and stores data and a program to be executed by the processor 901. The storage 905 may include a storage medium such as a semiconductor memory or a hard disk. For example, the above-described storage unit 18 may be configured by at least one of the memory 903 and the storage 905 or a combination thereof.

The operation device 907 includes a function of generating an input signal that is used for the user to perform a desired operation. The operation device 907 may include an input unit configured for the user to input information, for example, a button, a switch, or a touch pad, and an input control circuit configured to generate an input signal based on the user's input and supply the signal to the processor 901. For example, the above-described operation unit 12 may be configured as the operation device 907.

The display device 909 is an exemplary output device, and may include a device such as a liquid crystal display (LCD) device or an organic light emitting diode (OLED) display. The display device 909, for example, displays a screen and presents predetermined information to the user. Also, the above-described display unit 13 may be implemented by the display device 909.

The notification device 911 is, for example, a device such as the LED that notifies the user of predetermined information by a lighting or blinking pattern or an intensity of light to be emitted. In addition, the notification device 911 may be a device that notifies the user of predetermined information by outputting a predetermined acoustic signal such as a speaker. Also, the above-described notification unit 15 may be implemented by the notification device 911.

The first communication device 913 and the second communication device 915 are communication devices included in the card type terminal 10, and communicate with the external device via the network.

The first communication device 913 may also include a communication device using communication technology using NFC or wireless communication technology such as RFID technology. In order to implement contactless communication such as NFC, the first communication device 913 includes, for example, a high frequency signal generating unit configured to generate a high frequency signal, a demodulating unit configured to demodulate a signal, and an antenna serving as a communication interface with the external device. Also, the above-described first communication unit 171 may be implemented by the first communication device 913.

The second communication device 915 is, for example, a communication interface for wireless communication for implementing communication based on communication standards such as Bluetooth (registered trademark) or Wi-Fi (registered trademark). The second communication device 915 may also include a communication antenna, a radio frequency (RF) circuit, a baseband processor or the like.

The second communication device 915 includes a function of performing various types of signal processing on a signal received from the external device, and may supply a digital signal generated from the received analog signal to the processor 901. Also, the above-described second communication unit 172 may be implemented by the second communication device 915.

The bus 917 connects the processor 901, the memory 903, the storage 905, the operation device 907, the display device 909, the notification device 911, the first communication device 913 and the second communication device 915 to one another. The bus 917 may include a plurality of types of buses.

Also, although not illustrated in FIG. 17, the card type terminal 10 may also include a power device configured to supply power to each device in the card type terminal 10. The power device may include, for example, a battery. Also, the above-described power supply unit 19 may be implemented by the power device.

In addition, hardware such as a processor, a memory, and a storage, which are built in a computer, may also write a program for executing a function similar to a configuration of the above-described card type terminal 10. In addition, a computer readable storage medium in which the program is recorded may be provided.

9. CONCLUSION

As described above, in the card type terminal 10 according to an embodiment, the operation unit 12 is provided such that the proximity sensors 121 are arranged in the direction P11 in areas different from the display unit 13 on the upper surface 11, in the direction P11 along an arcuate axis. According to such a configuration, the card type terminal 10 may detect the swipe operation with respect to the operation surface of the operation unit 12, in the direction P11 along an arcuate axis.

In addition, when the display surface of the display unit 13 and the operation surface of the operation unit 12 are provided in different areas on the upper surface 11, the card type terminal 10 according to an embodiment may provide the display unit 13 and the first communication unit 171 for contactless short-range wireless communication separately from each other.

In addition, the card type terminal 10 according to an embodiment classifies various pieces of information presented to the user as a plurality of items, divides various pieces of information classified as each item into a plurality of levels to form a so-called tree structure, and further classifies information for each level. Then, the card type terminal 10 associates different operations such as the swipe operation and the tap operation with a process of switching between levels and switching the item that is divided in the selected level, and switches the screen (display item) in response to the operation.

In addition, the card type terminal 10 according to an embodiment controls display of the hierarchical information v51 on a screen according to the selected level and identifiably presents the selected level to the user.

According to such a configuration, when the user appropriately selects a desired item while switching a screen according to each operation, he or she can intuitively recognize a relation between items corresponding to screens.

Therefore, as in the card type terminal 10 according to an embodiment, even when a size of the display unit 13 is restricted and an amount of information that may be presented at the same time is limited, it is possible to present information efficiently.

It should be understood by those skilled in the art that various modifications, combinations, sub-combinations and alterations may occur depending on design requirements and other factors insofar as they are within the scope of the appended claims or the equivalents thereof.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)
An apparatus including:
a display unit; and
a plurality of sensor elements,
wherein the plurality of sensor elements are provided separate from the display unit,
wherein the display unit is configured to switch display between a plurality of output screens based on a user input on the plurality of sensor elements, the plurality of output screens including output screens having different hierarchical levels and output screens having a same hierarchical level, and
wherein the output screens having different hierarchical levels display information on the different hierarchical levels, and the switching display is controlled to switch display directly between the output screens having different hierarchical levels based on the user input.

(2)
The apparatus according to (1), wherein the user input is configured to be one of a first operation and a second operation.

(3)
The apparatus according to (1) or (2), wherein
when the user input is the first operation, the output screens having different hierarchical levels are switched sequentially based on the user input, and
when the user input is the second operation, the output screens having the same hierarchical levels are switched sequentially based on the user input.

(4)
The apparatus according to any of (1) to (3), wherein the first operation and the second operation are different operations.

(5)
The apparatus according to any of (1) to (4), wherein the first operation and the second operation have respective directionalities in relation to an arrangement of the plurality of sensor elements.

(6)
The apparatus according to any of (1) to (5), wherein the first operation and the second operation are gestures made in different directions.

(7)
The apparatus according to any of (1) to (6), wherein the display unit is further configured to display a visual indicator of hierarchical level for each respective output screen.

(8)
The apparatus according to any of (1) to (7), wherein the apparatus is a card-type terminal encased within a card-shaped housing.

(9)
The apparatus according to any of (1) to (8), wherein the display unit is further configured to switch display between the plurality of output screens by scrolling between the plurality of output screens.

(10)
The apparatus according to any of (1) to (9), wherein the display unit is further configured to switch display between output screens having the same hierarchical level, based on the user input swiping along the plurality of sensor elements.

(11)
The apparatus according to any of (1) to (10), wherein the display unit is further configured to switch display between output screens having different hierarchical levels, based on the user input tapping at least one of the plurality of sensor elements.

(12)
The apparatus according to any of (1) to (11), wherein:
the plurality of sensor elements includes a first sensor element, wherein the display unit switches display to a lower level hierarchical display screen based on the user input tapping the first sensor element; and
the plurality of sensor elements includes a second sensor element, wherein the display unit switches display to a higher level hierarchical display screen based on the user input tapping the second sensor element.

(13)
The apparatus according to any of (1) to (12), further including at least one communication unit provided to be separated from the display unit.

(14)
The apparatus according to any of (1) to (13), wherein the display unit further includes at least one of a liquid crystal display or an organic light emitting diode.

(15)
The apparatus according to any of (1) to (14), wherein the plurality of sensor elements includes at least one proximity sensor.

(16)
The apparatus according to any of (1) to (15), wherein the plurality of sensor elements includes at least one touch sensor.

(17)
The apparatus according to any of (1) to (16), wherein a notification is provided to indicate selection of one of the plurality of sensor elements.

(18)
The apparatus according to any of (1) to (17), further including
at least one light emitting unit,
wherein the at least one light emitting unit is configured to provide the notification by at least one of emit light or blink, to indicate the selection of one of the plurality of sensor elements.

(19)
A method including:
displaying at least one of a plurality of output screens on a display unit;
detecting a user input on a plurality of sensor elements, wherein the plurality of sensor elements are provided separate from the display unit; and
switching display between output screens of the plurality of output screens based on the user input on the plurality of sensor elements, the plurality of output screens including output screens having different hierarchical levels and output screens having a same hierarchical level,
wherein the switching display is controlled to switch display directly between the output screens having different hierarchical levels based on the user input, and the output screens having different hierarchical levels display information on the different hierarchical levels.

(20)
A non-transitory computer-readable medium having embodied thereon a program, which when executed by a computer causes the computer to execute a method, the method including:
displaying at least one of a plurality of output screens on a display unit;
detecting a user input on a plurality of sensor elements, wherein the plurality of sensor elements are provided separate from the display unit; and
switching display between output screens of the plurality of output screens based on the user input on the plurality of sensor elements, the plurality of output screens including output screens having different hierarchical levels and output screens having a same hierarchical level,
wherein the switching display is controlled to switch display directly between the output screens having different hierarchical levels based on the user input, and the output screens having different hierarchical levels display information on the different hierarchical levels.

(21)
An information processing apparatus including:
an operation unit configured to identify and receive a first operation and a second operation that are different from each other;
a display unit provided in an area different from the operation unit and configured to display any display item included in a selected level among display items divided into a plurality of levels; and
a control unit configured to receive the first operation and switch a first display item displayed on the display unit to a second display item that is different from the first display item and included in the selected level, and receive the second operation and switch the selected level to a different level,
wherein the control unit controls display of hierarchical information representing the level on the display unit according to the selected level.

(22)
The information processing apparatus according to (21), further including:
a communication unit configured to transmit and receive information based on contactless communication with an external device.

(23)
The information processing apparatus according to (22), wherein the communication unit is provided separately from the display unit.

(24)
The information processing apparatus according to any one of (21) to (23),
wherein the operation unit detects a change in a position on the operation surface in a direction along an arcuate axis of an operating body that comes in contact with or approaches an operation surface provided in an area different from the display unit, and receives the detected change in the position as the first operation.

(25)
The information processing apparatus according to (24), wherein the operation unit includes a sensor configured to detect contact or approach of the operating body.

(26)
The information processing apparatus according to (25), wherein the operation unit includes a plurality of the sensors that are arranged in the direction along the arcuate axis.

(27)
The information processing apparatus according to any one of (24) to (26), further including:
a notification unit configured to notify of information according to the detected change in the position.

(28)
The information processing apparatus according to (27), wherein the notification unit includes a light emitting unit and notifies of information using a light emitting state of the light emitting unit.

(29)
The information processing apparatus according to (28), wherein the notification unit causes the light emitting unit to light up or blink according to the first operation in the direction along the arcuate axis.

(30)
The information processing apparatus according to any one of (24) to (29),
wherein the control unit switches the first display item to the second display item by scrolling the first display item and the second display item in conjunction with the first operation in the direction along the arcuate axis.

(31)
The information processing apparatus according to (30), wherein the control unit switches the first display item to the second display item by scrolling the first display item and the second display item in an operation direction of the first operation in the direction along the arcuate axis.

(32)
The information processing apparatus according to any one of (24) to (31),
wherein the direction along the arcuate axis is set in a manner that, when a user and the operation surface directly face in a manner that a vertical direction of the display unit is proper, a center of at least one arc is positioned on any of left and right with respect to an axis that divides the operation surface into the left and right, and the at least one arc is positioned on the other side of the left and right with respect to the center.

(33)
The information processing apparatus according to (32), wherein the operation unit detects a change in the position of the operating body on the operation surface in a first arcuate direction that is set in a manner that a center of one of the arcs is positioned on any of left and right with respect to the axis and in a second arcuate direction that is set in a manner that a center of the other arc is positioned on the other side.

(34)
The information processing apparatus according to (33), wherein the control unit assigns different functions to the first operation according to a change in the position in the first direction and the second operation according to a change in the position in the second direction.

(35)
The information processing apparatus according to any one of (24) to (34), wherein the operation unit is provided in a manner that the operation surface directly faces a user when the user directly faces the display unit.

(36)
The information processing apparatus according to any one of (21) to (35), wherein the control unit presents a depth of the selected level as the hierarchical information.

(37)
The information processing apparatus according to any one of (21) to (36), wherein the control unit restricts candidacy for the different level to only a level that may be reached when a level is moved from the selected level in only any of an upward direction and a downward direction.

(38)
An information processing method including:
identifying and receiving, by an operation unit, a first operation and a second operation that are different from each other;
displaying, on a display unit provided in an area different from the operation unit, any display item included in a selected level among display items divided into a plurality of levels;
receiving, by a processor, the first operation and switching a first display item displayed on the display unit to a second display item that is different from the first display item and included in the selected level;
receiving the second operation and switching the selected level to a different level; and
controlling display of hierarchical information representing the level on the display unit according to the selected level.

(39)
A program causing a computer to execute:
identifying and receiving, by an operation unit, a first operation and a second operation that are different from each other;
displaying, on a display unit provided in an area different from the operation unit, any display item included in a selected level among display items divided into a plurality of levels;
receiving the first operation and switching a first display item displayed on the display unit to a second display item that is different from the first display item and included in the selected level;
receiving the second operation and switching the selected level to a different level; and
controlling display of hierarchical information representing the level on the display unit according to the selected level.

REFERENCE SIGNS LIST 10, 10a card type terminal
11 upper surface
12, 12a, 12b operation unit
121 proximity sensor
123 proximity sensor
125 proximity sensor
13 display unit
15 notification unit
171 first communication unit
172 second communication unit
18 storage unit
19 power supply unit
100 control unit
101 communication control unit
103 calculation unit
105 input analyzing unit
107 input and output control unit
80 reader/writer
90 information processing terminal

The invention claimed is:

1. An apparatus comprising:
a display unit; and
a first operation unit and a second operation unit, each of the first operation unit and the second operation unit including a plurality of sensor elements,
wherein the first operation unit and the second operation unit are provided separate from the display unit,
wherein the display unit is configured to:
determine a user input to be one of a first operation and a second operation; and
switch display between a plurality of output screens having different hierarchical levels and a same hierarchical level based on the user input on the plurality of sensor elements, wherein the display unit is further configured to switch display directly between the output screens having the different hierarchical levels and displaying items having the different hierarchical levels, based on the user input,
wherein the first operation includes a tapping of at least one predetermined sensor element of at least one of the plurality of sensor elements,
wherein the second operation includes a swiping along the plurality of sensor elements including the at least one predetermined sensor element,
wherein the display unit is further configured to:
switch display between output screens having the same hierarchical level, based on the user input being the second operation; and
switch display between output screens having the different hierarchical levels, based on the user input being the first operation,
wherein the first operation unit and the second operation unit cross each other in an X-shape, and
wherein the first operation unit is arranged along one arc having an arcuate axis set in a location of the user input of a right thumb such that a center of the one arc is positioned to a left side with respect to an axis that divides the display unit into the left side and a right side and the second operation unit is arranged in another arc having an arcuate axis set in a location of the user input of a left thumb such that a center of the another arc is positioned to the right side with respect to the axis that divides the display unit into the left side and the right side.

2. The apparatus of claim 1, wherein
when the user input is the first operation, the output screens having the different hierarchical levels are switched sequentially based on the user input, and
when the user input is the second operation, the output screens having the same hierarchical level are switched sequentially based on the user input.

3. The apparatus of claim 1, wherein the first operation and the second operation have respective directionalities in relation to an arrangement of the plurality of sensor elements.

4. The apparatus of claim 1, wherein the first operation and the second operation are gestures with different directionalities.

5. The apparatus of claim 1, wherein the display unit is further configured to display a visual indicator of hierarchical level for each respective output screen.

6. The apparatus of claim 1, wherein the apparatus is a card-type terminal encased within a card-shaped housing.

7. The apparatus of claim 1, wherein the display unit is further configured to switch display between the plurality of output screens by scrolling between the plurality of output screens.

8. The apparatus of claim 1, wherein
the at least one predetermined sensor element comprises a first sensor element, wherein the display unit switches display to a lower level hierarchical output screen of the plurality of output screens based on the user input tapping the first sensor element, and
the at least one predetermined sensor element comprises a second sensor element, wherein the display unit switches display to a higher level hierarchical output screen of the plurality of output screens based on the user input tapping the second sensor element.

9. The apparatus of claim 1, further comprising:
at least one communication unit provided to be separated from the display unit.

10. The apparatus of claim 1, wherein the display unit further comprises at least one of a liquid crystal display or an organic light emitting diode.

11. The apparatus of claim 1, wherein the plurality of sensor elements comprises at least one proximity sensor.

12. The apparatus of claim 1, wherein the plurality of sensor elements comprises at least one touch sensor.

13. The apparatus of claim 1, wherein a notification is provided to indicate selection of one sensor element of the plurality of sensor elements.

14. The apparatus of claim 13, further comprising:
at least one light emitting unit,
wherein the at least one light emitting unit is configured to provide the notification by at least one of emit light or blink, to indicate the selection of one sensor element of the plurality of sensor elements.

15. A method comprising:
displaying at least one output screen of a plurality of output screens on a display unit;
detecting a user input on a first operation unit or a second operation unit including, each of the first operation unit and the second operation unit including a plurality of sensor elements, wherein the first operation unit and the second operation unit are provided separate from the display unit;
determining a user input to be one of a first operation and a second operation; and
switching display between output screens of the plurality of output screens having different hierarchical levels and a same hierarchical level based on the user input on the plurality of sensor elements, wherein the switching display is controlled to switch display directly between the output screens having the different hierarchical levels and displaying items having the different hierarchical levels, based on the user input,
wherein the first operation includes a tapping of at least one predetermined sensor element of at least one of the plurality of sensor elements,
wherein the second operation includes a swiping along the plurality of sensor elements including the at least one predetermined sensor element,
wherein the switching display is controlled to switch display between output screens having the same hierarchical level, based on the user input being the second operation,
wherein the switching display is controlled to switch display between output screens having the different hierarchical levels, based on the user input being the first operation,
wherein the first operation unit and the second operation unit cross each other in an X-shape, and
wherein the first operation unit is arranged along one arc having an arcuate axis set in a location of the user input of a right thumb such that a center of the one arc is positioned to a left side with respect to an axis that divides the display unit into the left side and a right side and the second operation unit is arranged in another arc having an arcuate axis set in a location of the user input of a left thumb such that a center of the another arc is positioned to the right side with respect to the axis that divides the display unit into the left side and the right side.

16. A non-transitory computer-readable medium having embodied thereon a program, which when executed by a computer causes the computer to execute a method, the method comprising:
displaying at least one output screen of a plurality of output screens on a display unit;
detecting a user input on a first operation unit or a second operation unit, each of the first operation unit and the second operation unit including a plurality of sensor elements, wherein the first operation unit and the second operation unit are provided separate from the display unit;
determining a user input to be one of a first operation and a second operation; and
switching display between output screens of the plurality of output screens having different hierarchical levels and a same hierarchical level based on the user input on the plurality of sensor elements, wherein the switching display is controlled to switch display directly between the output screens having the different hierarchical levels and displaying items having the different hierarchical levels, based on the user input,
wherein the first operation includes a tapping of at least one predetermined sensor element of at least one of the plurality of sensor elements,
wherein the second operation includes a swiping along the plurality of sensor elements including the at least one predetermined sensor element,
wherein the switching display is controlled to switch display between output screens having the same hierarchical level, based on the user input being the second operation,
wherein the switching display is controlled to switch display between output screens having the different hierarchical levels, based on the user input being the first operation,
wherein the first operation unit and the second operation unit cross each other in an X-shape, and
wherein the first operation unit is arranged along one arc having an arcuate axis set in a location of the user input of a right thumb such that a center of the one arc is positioned to a left side with respect to an axis that divides the display unit into the left side and a right side and the second operation unit is arranged in another arc having an arcuate axis set in a location of the user input of a left thumb such that a center of the another arc is positioned to the right side with respect to the axis that divides the display unit into the left side and the right side.

17. The apparatus of claim 8, wherein the second operation includes a swiping along the plurality of sensor elements including the first sensor element and the second sensor element.

18. The apparatus of claim 1, wherein each output screen of the plurality of output screens display only one item of a plurality of items, and
    wherein the plurality of items are included in the different hierarchical levels and the same hierarchical level.

\* \* \* \* \*